United States Patent
Kadota et al.

(10) Patent No.: US 10,998,830 B2
(45) Date of Patent: May 4, 2021

(54) POWER CONVERSION DEVICE AND THREE-PHASE POWER CONVERSION DEVICE

(71) Applicant: Hitachi, Ltd., Tokyo (JP)

(72) Inventors: Mitsuhiro Kadota, Tokyo (JP); Takae Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/616,021

(22) PCT Filed: Apr. 24, 2018

(86) PCT No.: PCT/JP2018/016521
§ 371 (c)(1),
(2) Date: Nov. 22, 2019

(87) PCT Pub. No.: WO2018/225410
PCT Pub. Date: Dec. 13, 2018

(65) Prior Publication Data
US 2020/0091831 A1 Mar. 19, 2020

(30) Foreign Application Priority Data
Jun. 6, 2017 (JP) .............................. JP2017-111364

(51) Int. Cl.
*H02M 1/00* (2006.01)
*H02M 1/32* (2007.01)
(Continued)

(52) U.S. Cl.
CPC ......... *H02M 5/4585* (2013.01); *H02M 7/219* (2013.01); *H02M 7/53871* (2013.01)

(58) Field of Classification Search
CPC . H02M 2001/0077; H02M 2001/0074; H02M 2001/007; H02M 2001/325;
(Continued)

(56) References Cited

U.S. PATENT DOCUMENTS

| 6,563,726 B1 * | 5/2003 | Hirst | H02M 7/219 363/127 |
| 2014/0268928 A1 * | 9/2014 | Wei | H02M 5/458 363/37 |

(Continued)

FOREIGN PATENT DOCUMENTS

| JP | 2009-33943 A | 2/2009 |
| JP | 2012-147613 A | 8/2012 |

(Continued)

OTHER PUBLICATIONS

International Search Report (PCT/ISA/210) issued in PCT Application No. PCT/JP2018/016521 dated Jul. 3, 2018 with English translation (three (3) pages).

(Continued)

*Primary Examiner* — Thienvu V Tran
*Assistant Examiner* — Sisay G Tiku
(74) *Attorney, Agent, or Firm* — Crowell & Moring LLP

(57) ABSTRACT

A power conversion device includes: power conversion cells; and a controller to control the cells. Each cell includes: a transformer; a primary conversion unit on a primary side of the transformer; a secondary conversion unit on a secondary side; a primary bypass device for short-circuiting between input terminals of the cell; and a secondary bypass device for short-circuiting between output terminals of the cell. The input terminals and/or the output terminals of the cells are connected in series. When the primary conversion unit(s) of a part of the cells is stopped, the controller turns on the primary bypass device and sets secondary DC link voltages to prescribed values; and when the secondary conversion unit(s) of a part of the cells is stopped, the controller turns on the secondary bypass device and controls the primary conversions units to set primary DC link voltages to prescribed values.

6 Claims, 18 Drawing Sheets

(51) Int. Cl.
*H02M 1/36* (2007.01)
*H02M 5/458* (2006.01)
*H02M 7/219* (2006.01)
*H02M 7/5387* (2007.01)

(58) Field of Classification Search
CPC ............... H02M 5/4585; H02M 7/219; H02M 7/53871; H02M 1/36; H02M 1/32
See application file for complete search history.

(56) References Cited

U.S. PATENT DOCUMENTS

| | | | | |
|---|---|---|---|---|
| 2015/0171733 A1* | 6/2015 | Zargari | ............... | H02M 5/4585 307/52 |
| 2016/0013716 A1* | 1/2016 | Hur | ............... | H02M 1/32 363/50 |
| 2017/0126008 A1* | 5/2017 | Shen | ............... | H02J 3/38 |
| 2017/0163170 A1* | 6/2017 | Tahata | ............... | H02M 7/483 |
| 2020/0119659 A1* | 4/2020 | Shinomiya | ............... | H02M 7/48 |

FOREIGN PATENT DOCUMENTS

| | | | | |
|---|---|---|---|---|
| JP | 2015156740 A | * | 8/2015 | |
| JP | 2017-77114 A | | 4/2017 | |
| WO | WO-2017094379 A1 | * | 6/2017 | ............... H02M 7/48 |
| WO | WO-2017179179 A1 | * | 10/2017 | ............... H02M 7/48 |

OTHER PUBLICATIONS

Japanese-language Written Opinion (PCT/ISA/237) issued in PCT Application No. PCT/JP2018/016521 dated Jul. 3, 2018 (six (6) pages).

* cited by examiner

POWER CONVERSION DEVICE AND THREE-PHASE POWER CONVERSION DEVICE

TECHNICAL FIELD

The present invention relates to a power conversion device and a three-phase power conversion device.

BACKGROUND ART

For high-voltage or large-capacity power conversion is used a power conversion device in which a plurality of power conversion cells are connected in series or in parallel. For instance, to drive a high-voltage motor, widely used is a system in which output terminals of a plurality of inverters (inverter cells, power conversion cells) are connected in series and the output voltages of the inverters are synthesized to output a high voltage.

In addition, natural energy power generation such as photovoltaic power generation and wind power generation has been increasingly introduced world-wide. PCS (power conditioning system) has been known as a power conversion device for converting natural energy-derived electric power and outputting the converted electric power to a power system. Even in this PCS, it is effective to use a plurality of power conversion cells when the voltage thereof becomes high and/or the capacity thereof becomes large accordingly as described above.

Securing reliability is important for a power conversion device including a plurality of power conversion cells. As a function about the reliability, conventional power conversion devices have a function of continuing operation using the rest cells even if some of power conversion cells are to be stopped due to, for instance, malfunction and maintenance thereof. Examples of the power conversion device having such a function include Patent Literature 1.

CITATION LIST

Patent Literature

[Patent Literature 1] Japanese Patent Application Publication No. 2009-033943

SUMMARY OF INVENTION

Technical Problem

Unfortunately, conventional power conversion devices should have a backup inverter(s) that is prepared for the case of occurrence of malfunction in a single-phase inverter.

The present invention has been created in view of the above problem. The purpose of the present invention is to provide a power conversion device appropriately responding, without providing any backup power conversion cell, to power conversion cell malfunction and/or maintenance.

Solution to Problem

The present invention has been developed below to solve the problem.

There is provided a power conversion device comprising:
a plurality of power conversion cells; and
a controller configured to control the plurality of power conversion cells,
each power conversion cell comprising:
a transformer;
a primary conversion unit disposed on a primary side of the transformer;
a secondary conversion unit disposed on a secondary side of the transformer;
a primary bypass device for causing a circuit to short between input terminals of the power conversion cell; and
a secondary bypass device for causing a circuit to short between output terminals of the power conversion cell,
wherein
the power conversion cell input terminals and/or the output terminals of the plurality of power conversion cells are connected in series;
when the primary conversion unit of a part of the plurality of power conversion cells is to be stopped, the controller turns on the primary bypass device(s) and controls the secondary conversion units to set secondary DC link voltages generated in the secondary conversion units to prescribed values; and
when the secondary conversion unit of a part of the plurality of power conversion cells is to be stopped, the controller turns on the secondary bypass device(s) and controls the primary conversions units to set primary DC link voltages generated in the primary conversion units to prescribed values.

In addition, other solutions will be described in the Description of Embodiments.

Advantageous Effects of Invention

The present invention provides a power conversion device such that one can appropriately respond, without providing any backup power conversion cell, to power conversion cell malfunction and/or maintenance.

DESCRIPTION OF EMBODIMENTS

Hereinafter, modes for carrying out the present invention (hereinafter, referred to as "embodiments") are described with reference to the Drawings, if appropriate.

First Embodiment

Figure 1:
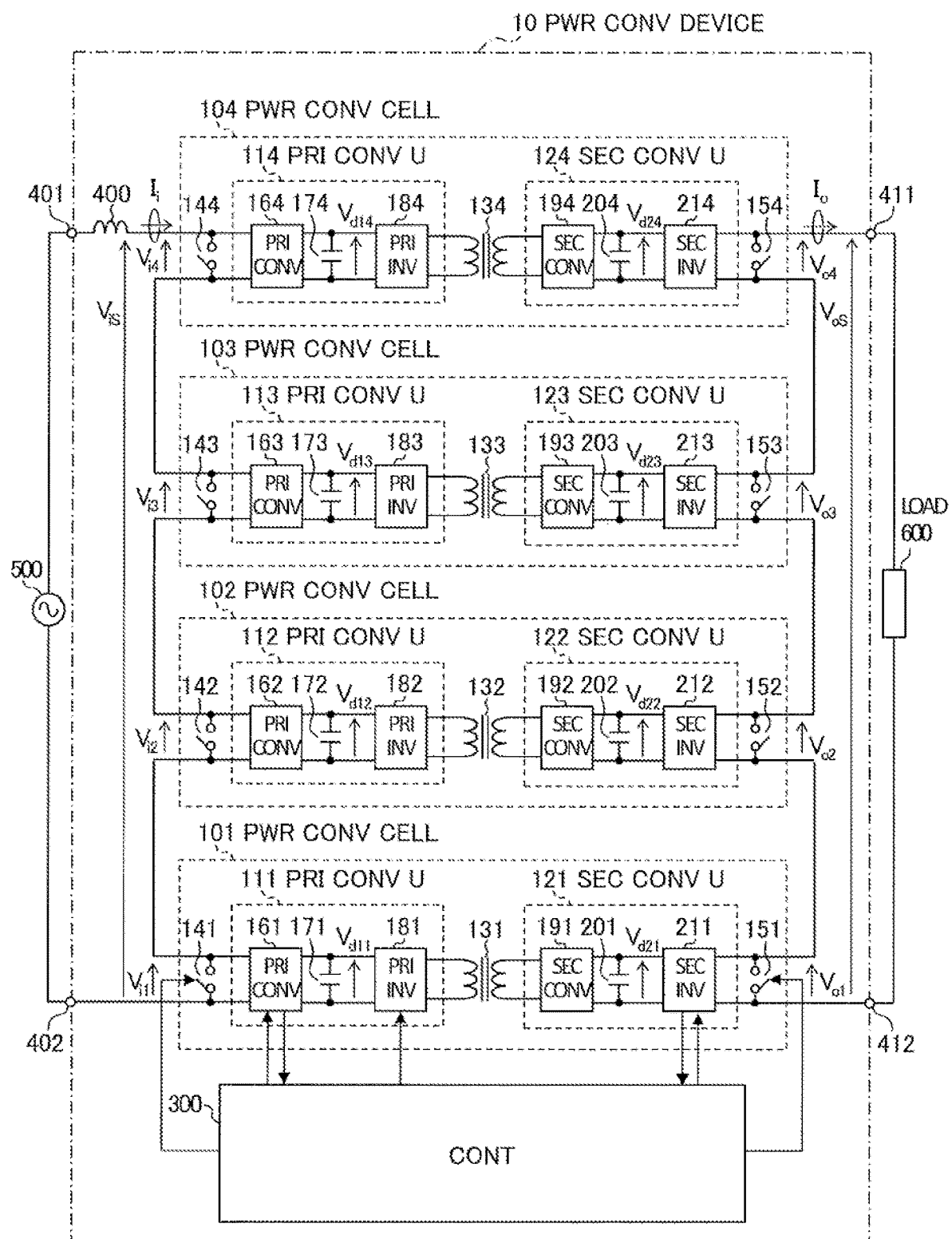
FIG. 1 is a block diagram illustrating a circuit configuration example of a power conversion device according to a first embodiment of the present invention.

FIG. 1 is a block diagram illustrating a circuit configuration example of a power conversion device 10 according to a first embodiment of the present invention. In FIG. 1, the power conversion device 10 converts electric power input through input terminals 401 and 402 from an external AC power source 500 into AC power with a variable frequency and a variable voltage. Then, the power conversion device 10 outputs and supplies the AC power through output terminals 411 and 412 to an external load 600.

In addition, in FIG. 1, in the power conversion device 10, the input terminal 401 receiving power from the AC power source 500 is provided with a reactor 400.

Further, the power conversion device 10 includes a plurality of power conversion cells 101 to 104 and a controller 300. Furthermore, in the power conversion device 10, respective input terminals of the power conversion cells 101 to 104 are connected in series. Likewise, respective output terminals of the power conversion cells 101 to 104 are connected in series.

<<Power Conversion Cell>>

The power conversion cells 101 to 104 include primary conversion units 111 to 114, secondary conversion units 121 to 124, transformers 131 to 134, primary bypass devices (means) 141 to 144, and secondary bypass devices (means) 151 to 154, respectively.

The primary conversion units 111 to 114 each convert input AC power (voltage) to AC power (voltage) with a variable frequency and a variable voltage.

The transformers 131 to 134 transform, based on prescribed transformation ratios, input AC voltages to output AC voltages, which are supplied to the secondary conversion units 121 to 124, respectively.

The secondary conversion units 121 to 124 each convert input AC power (voltage) to AC power (voltage) with a variable frequency and a variable voltage.

The primary bypass devices (for example, switches) 141 to 144 each cause a circuit to short between input terminals of the power conversion cells 101 to 104, respectively.

The secondary bypass devices (for example, switches) 151 to 154 each cause a circuit to short between output terminals of the power conversion cells 101 to 104, respectively. Note that examples of the primary bypass devices 141 to 144 and the secondary bypass devices 151 to 154 include bypass circuits and/or relays using switching elements.

The primary conversion units 111 to 114 include primary converters 161 to 164, capacitors 171 to 174, and primary inverters 181 to 184, respectively.

The primary converters 161 to 164 convert input voltages $V_{i1}$ to $V_{i4}$ of the power conversion cells 101 to 104 to generate primary DC link voltages $V_{d11}$ to $V_{d14}$, respectively.

The capacitors 171 to 174 smooth (make flat) the primary DC link voltages $V_{d11}$ to $V_{d14}$, respectively.

The primary inverters 181 to 184 convert the primary DC link voltages $V_{d11}$ to $V_{d14}$ to AC voltages, which are then applied to primary windings of the transformers 131 to 134, respectively.

The secondary conversion units 121 to 124 include secondary converters 191 to 194, capacitors 201 to 204, and secondary inverters 211 to 214, respectively.

The secondary converters 191 to 194 convert AC voltages induced in secondary windings of the transformers 131 to 134 to generate secondary DC link voltages $V_{d21}$ to $V_{d24}$, respectively.

The capacitors 201 to 204 smooth the secondary DC link voltages $V_{d21}$ to $V_{d24}$, respectively.

The secondary inverters 211 to 214 convert the secondary DC link voltages $V_{d21}$ to $V_{d24}$ to 104 to AC voltages and the AC voltages are used to generate output voltages $V_{o1}$ to $V_{o4}$ of the power conversion cells 101 to 104, respectively.

<<Controller>>

The controller 300 outputs control signals to and generally controls the primary conversion units 111 to 114, the secondary conversion units 121 to 124, the primary bypass devices 141 to 144, and the secondary bypass devices 151 to 154 of the power conversion cells 101 to 104, respectively.

In addition, the controller 300 detects the physical levels, such as voltages, currents, and/or temperatures, of the power conversion cells 101 to 104. Here, detection signals are defined as signals that are input into the controller 300 and are related to the physical levels and/or states of the power conversion cells 101 to 104.

The controller 300 not only uses the detection signals for control, but also uses the detection signals to grasp phenomena such as "the voltage at a correct target value is not output" and "overcurrent occurs", thereby determining whether each power conversion cell is normal or abnormal.

Meanwhile, in FIG. 1, to prevent the drawing from becoming complicated, only control signals and detection signals between the controller 300 and the power conversion cell 101 are depicted. Actually, the controller 300 likewise outputs and inputs signals to and from the power conversion cells 102 to 104.

In addition, FIG. 1 illustrates, based on the below-described specific configuration of the power conversion cell 101, a configuration in which the primary converter 161 and the secondary inverter 211 output detection signals to the controller 300 and the controller 300 outputs control signals to the primary converter 161, the primary inverter 181, the secondary inverter 211, the primary bypass device 141, and the secondary bypass device 151.

Provided that as described below, when the specific configuration of each power conversion cell is changed, to and from which the controller 300 outputs and inputs signals is also changed. Here, in FIG. 1, each signal is denoted by a single arrow and the single arrow may include plural pieces of information.

Also, all the components of the controller 300 need not be mounted on one substrate. Some components of the controller 300 may be mounted on a substrate where the primary conversion units 111 to 114 and/or the secondary conversion units 121 to 124 of the power conversion cells 101 to 104 are each mounted.

<<Supplementary Information about Circuit Configuration of Power Conversion Device in FIG. 1>>

As shown in FIG. 1, in the power conversion device 10, input terminals of the respective power conversion cells 101 to 104 are connected in series. Likewise, output terminals of the respective power conversion cells 101 to 104 are connected in series.

The respective power conversion cells 101 to 104 internally include the transformers 131 to 134; and the primary conversion units 111 to 114 are electrically insulated from the secondary conversion units 121 to 124, respectively. Hence, the power conversion cells 101 to 104 can be connected to one another as illustrated in FIG. 1.

The above connection method makes it possible to connect the power source 500 to an input unit of the power conversion device 10 even if the power source 500 is a high-voltage power source. In addition, it is possible to output a high voltage from the power conversion device 10 to the load 600.

Here, output terminals of the respective power conversion cells 101 to 104 are connected in series. Accordingly, the voltage synthesized using the output voltages $V_{o1}$ to $V_{o4}$ of the power conversion cells 101 to 104, respectively, is output through the output terminals 411 and 412 to the load 600.

The voltage synthesized using the output voltages $V_{o1}$ to $V_{o4}$ of the power conversion cells 101 to 104, respectively, is defined as a synthetic output voltage $V_{oS}$. In addition, the input side can be likewise defined. The voltage synthesized using the input voltages $V_{i1}$ to $V_{i4}$ of the power conversion cells 101 to 104, respectively, is defined as a synthetic input voltage $V_{iS}$.

Further, the output current $I_o$ of the power conversion device 10 and the output currents of the respective power conversion cells 101 to 104 are all shared. Likewise, the input current $I_i$ of the power conversion device 10 and the input currents of the respective power conversion cells 101 to 104 are all shared.

How the reactor 400 in FIG. 1 plays a role is described.

The external AC power source 500 outputs a sinusoidal AC voltage. By contrast, a synthetic input voltage $V_{iS}$ in the power conversion device 10 is a stepwise pseudo-sine waveform (multi-level pseudo sine waveform) as shown in FIGS. 4A to 4E below. The difference between the output sine wave and the pseudo sine waveform of the synthetic input voltage $V_{iS}$ is adjusted by providing the reactor 400.

In addition, the reactor 400 serves not to cause spikes (noise), due to the synthetic input voltage $V_{iS}$ in the power conversion device 10, to be in the external AC power source 500.

<<Circuit Configuration Example of Primary Conversion Unit>>

Figure 2:
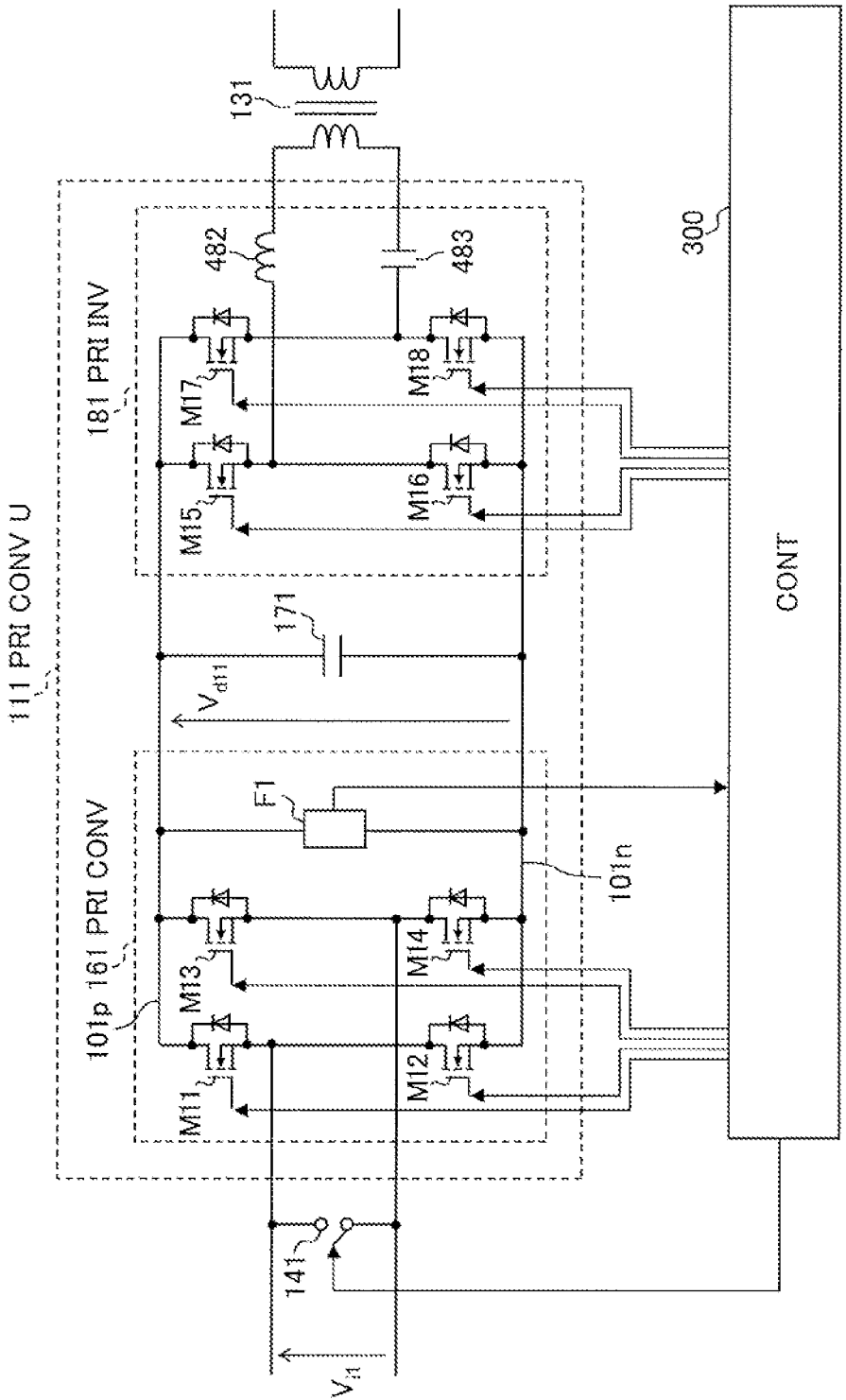
FIG. 2 is a diagram showing a circuit configuration example of a primary conversion unit in a power conversion cell according to the first embodiment of the present invention.

FIG. 2 is a diagram showing a circuit configuration example of the primary conversion unit 111 in the power conversion cell 101 according to the first embodiment of the present invention. In addition, FIG. 2 also illustrates the primary bypass device 141, the transformer 131, and the controller 300 in addition to the primary conversion unit 111.

In FIG. 2, the primary conversion unit 111 includes the primary converter 161, the capacitor 171, and the primary inverter 181.

The primary converter 161 is provided with switching elements M11 to M14 including MOSFETs (Metal-Oxide- Semiconductor-Field-Effect-Transistors) and antiparallel diodes. The switching elements M11 to M14 constitute an H-bridge circuit.

Specifically, the switching element M11 and the switching element M12 are connected in series and are arranged between positive-side DC power source wiring 101p and negative-side DC power source wiring 101n. In addition, the switching element M13 and the switching element M14 are connected in series and are arranged between the positive-side DC power source wiring 101p and the negative-side DC power source wiring 101n.

An input voltage $V_{i1}$ is input, into a connection point between the switching elements M11 and M12 and a connection point between the switching elements M13 and M14, to control the switching elements M11 to M14 by the controller 300. In this way, the input voltage $V_{i1}$ is rectified and output between the positive-side DC power source wiring 101p and the negative-side DC power source wiring 101n. Then, the rectified voltage is smoothed by the capacitor 171 to generate a DC voltage (power).

In addition, the primary converter 161 is equipped with a voltage detector F1 for detecting a voltage between the positive-side DC power source wiring 101p and the negative-side DC power source wiring 101n, namely, a primary DC link voltage $V_{d11}$.

The primary inverter 181 is provided with switching elements M15 to M18 including MOSFETs and antiparallel diodes. The switching elements M15 to M18 constitute an H-bridge circuit. Specifically, the switching element M15 and the switching element M16 are connected in series and are arranged between the positive-side DC power source wiring 101p and the negative-side DC power source wiring 101n. In addition, the switching element M17 and the switching element M18 are connected in series and are arranged between the positive-side DC power source wiring 101p and the negative-side DC power source wiring 101n.

A connection point between the switching elements M15 and M16 and a connection point between the switching elements M17 and M18 are output terminals of the H-bridge circuit.

The connection point between the switching elements M15 and M16, which connection point is a first output terminal of the H-bridge circuit, is connected to one of terminals of a coil (inductor, reactor) 482. The connection point between the switching elements M17 and M18, which connection point is a second output terminal of the H-bridge circuit, is connected to one of terminals of a capacitor 483. Primary winding of the transformer 131 is serially connected between the other terminal of the coil 482 and the other terminal of the capacitor 483.

The controller 300 outputs, as control signals, driving signals to the switching elements M11 to M14 of the primary converter 161 and the switching elements M15 to M18 of the primary inverter 181.

In addition, the output of the voltage detector F1 for detecting the primary DC link voltage $V_{d11}$ is input, as detection signals, to the controller 300.

In the primary conversion unit 111 of FIG. 2, the AC input voltage $V_{i1}$ is rectified by the primary converter 161 and then leveled by the capacitor 171 to generate a DC voltage (power) $V_{d11}$ between the positive-side DC power source wiring 101p and the negative-side DC power source wiring 101n.

This DC voltage (power) is converted by the primary inverter 181 to generate an AC voltage (power) with a variable frequency. This generated AC voltage (power) goes through the coil 482 and the capacitor 483 and is output from the primary conversion unit 111.

Note that the coil 482 and the capacitor 483 constitute a resonance circuit. When the frequency of control signals for the primary inverter 181 is changed, the output power of the primary conversion unit 111 can be controlled in accordance with how much this frequency deviates from the resonance frequency or resonance characteristic of the resonance circuit.

In view of the above, how the primary conversion unit 111 of the power conversion cell 101 in FIG. 2 is configured is explained. Here, the same applies to the configurations of the primary conversion units 112 to 114 of the power conversion cells 102 to 104.

<<Circuit Configuration Example of Secondary Conversion Unit>>

Figure 3:
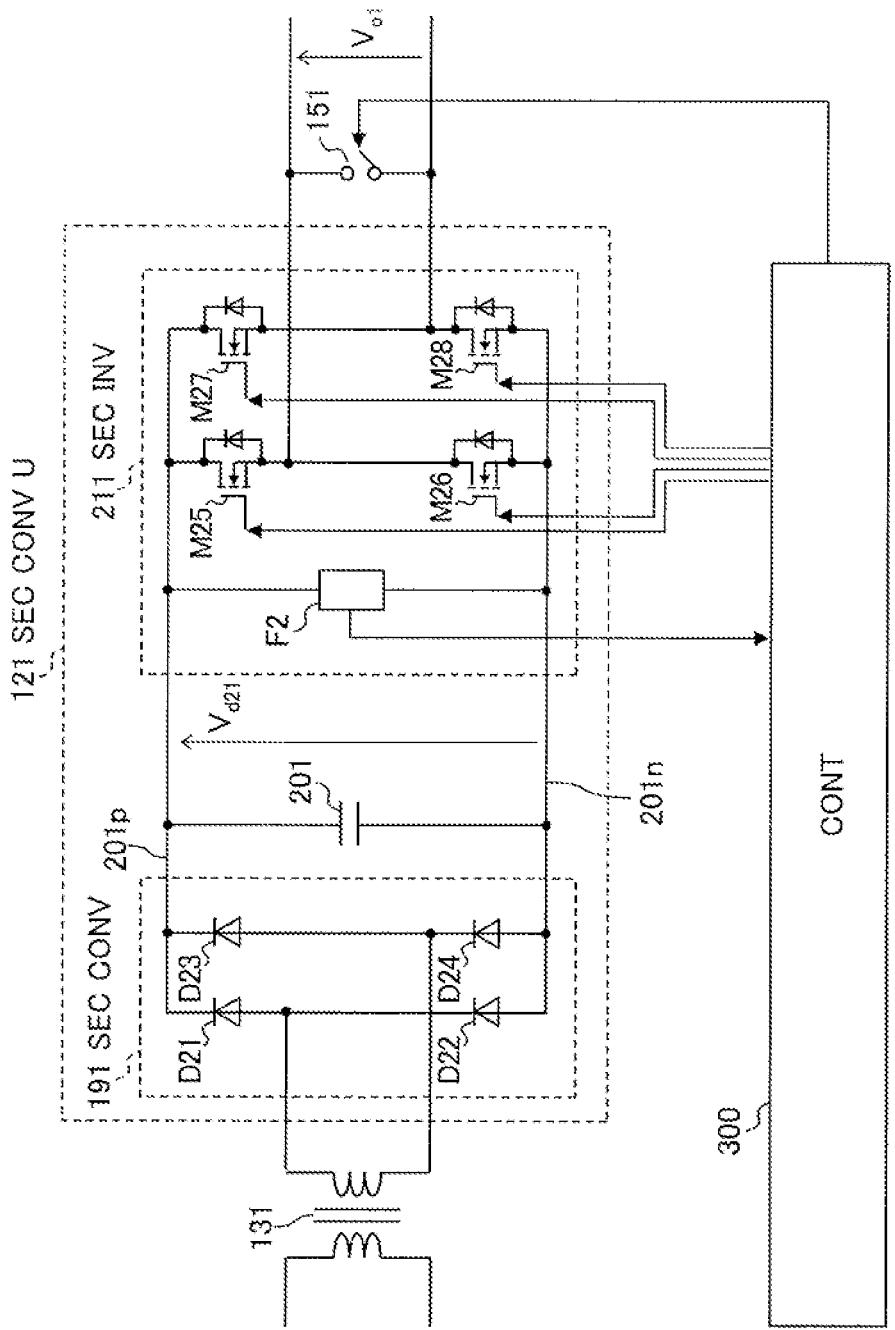
FIG. 3 is a diagram showing a circuit configuration example of a secondary conversion unit in the power conversion cell according to the first embodiment of the present invention.

FIG. 3 is a diagram showing a circuit configuration example of the secondary conversion unit 121 in the power conversion cell 101 according to the first embodiment of the present invention.

In addition, FIG. 3 also illustrates the secondary bypass device 151, the transformer 131, and the controller 300 in addition to the secondary conversion unit 121.

In FIG. 3, the secondary conversion unit 121 includes the secondary converter 191, the capacitor 201, and the secondary inverter 211.

In the secondary converter 191, diodes D21 to D24 constitute a diode bridge circuit. Specifically, the anode of the diode D21 and the cathode of the diode D22 are connected; the cathode of the diode D21 is connected to positive-side DC power source wiring 201p; and the anode of the diode D22 is connected to negative-side DC power source wiring 201n.

In addition, the anode of the diode D23 and the cathode of the diode D24 are connected; the cathode of the diode D23 is connected to the positive-side DC power source wiring 201p; and the anode of the diode D24 is connected to the negative-side DC power source wiring 201n.

The voltage of secondary winding of the transformer 131 is input into a connection point between the anode of the diode D21 and the cathode of the diode D22 and a connection point between the anode of the diode D23 and the cathode of the diode D24.

Further, the capacitor 201 for smoothing is placed between the positive-side DC power source wiring 201p and the negative-side DC power source wiring 201n.

The secondary inverter 211 is provided with switching elements M25 to M28 including MOSFETs and antiparallel diodes. The switching elements M25 to M28 constitute an H-bridge circuit. Specifically, the switching element M25 and the switching element M26 are connected in series and are arranged between the positive-side DC power source wiring 201p and the negative-side DC power source wiring 201n. In addition, the switching element M27 and the switching element M28 are connected in series and are arranged between the positive-side DC power source wiring 201p and the negative-side DC power source wiring 201n.

A connection point between the switching elements M25 and M26 and a connection point between the switching elements M27 and M28 are output terminals of the H-bridge circuit.

The output voltage $V_{o1}$ of the power conversion cell 101 is output from the output terminals of this H-bridge circuit.

In addition, the secondary inverter 211 is equipped with a voltage detector F2 for detecting a secondary DC link voltage $V_{d21}$ that is a voltage between the positive-side DC power source wiring 201p and the negative-side DC power source wiring 201n.

The output of the voltage detector F2 is input, as detection signals, to the controller 300.

The controller 300 outputs, as control signals, driving signals to the switching elements M25 to M28 of the secondary inverter 211.

Further, the output of the voltage detector F2 for detecting the secondary DC link voltage $V_{d21}$ is input, as detection signals, to the controller 300.

In the secondary conversion unit 121 of FIG. 3, the transformer 131-derived secondary-side (secondary winding) AC input voltage is rectified by the secondary converter 191 and then smoothed by the capacitor 201 to generate a DC voltage (power) $V_{d21}$ between the positive-side DC power source wiring 201p and the negative-side DC power source wiring 201n.

This DC voltage (power) is inverted by the secondary inverter 211 to generate an AC voltage (power) with a variable frequency. Then, the resulting AC voltage (power) $V_{o1}$ is output from the secondary conversion unit 121.

As described above, how the secondary conversion unit 121 of the power conversion cell 101 in FIG. 3 is configured is explained. Here, the same applies to the configurations of the secondary conversion units 122 to 124 of the power conversion cells 102 to 104.

<How Power Conversion Device in Normal State Works>

The following describes how the power conversion device 10 as obtained using the above configurations works in a normal state.

First, a case (referred to as a "normal state", if appropriate) is described where neither any of the primary conversion units 111 to 114 nor any of the secondary conversion units 121 to 124 of the respective power conversion cells 101 to 104 is stopped due to, for instance, malfunction and/or maintenance.

The controller 300 turns off (in an open state, in a nonshorting state) the primary bypass devices 141 to 144 and the secondary bypass devices 151 to 154 of the power conversion cells 101 to 104.

<<Output Voltage Waveforms of Respective Power Conversion Cells and Synthetic Output Voltage Waveform>>

FIGS. 4A to 4E are charts illustrating an example of waveforms of the output voltage $V_{o1}$ to $V_{o4}$ of the respective power conversion cells 101 to 104 in the power conversion device 10 according to the first embodiment of the present invention and an example of the waveform of synthetic output voltage $V_{oS}$ synthesized therefrom.

In FIGS. 4A to 4E, the ordinate represents the output voltages $V_{o1}$ to $V_{o4}$, the synthetic output voltage $V_{oS}$, and the target values $V_2$ of the secondary DC link voltages; and the abscissa is a time point or time (time course).

In addition, FIGS. 4A to 4E show waveforms of the respective voltages during one cycle of AC cycle $T_{AC2}$ output from the power conversion device 10.

Figure 4:
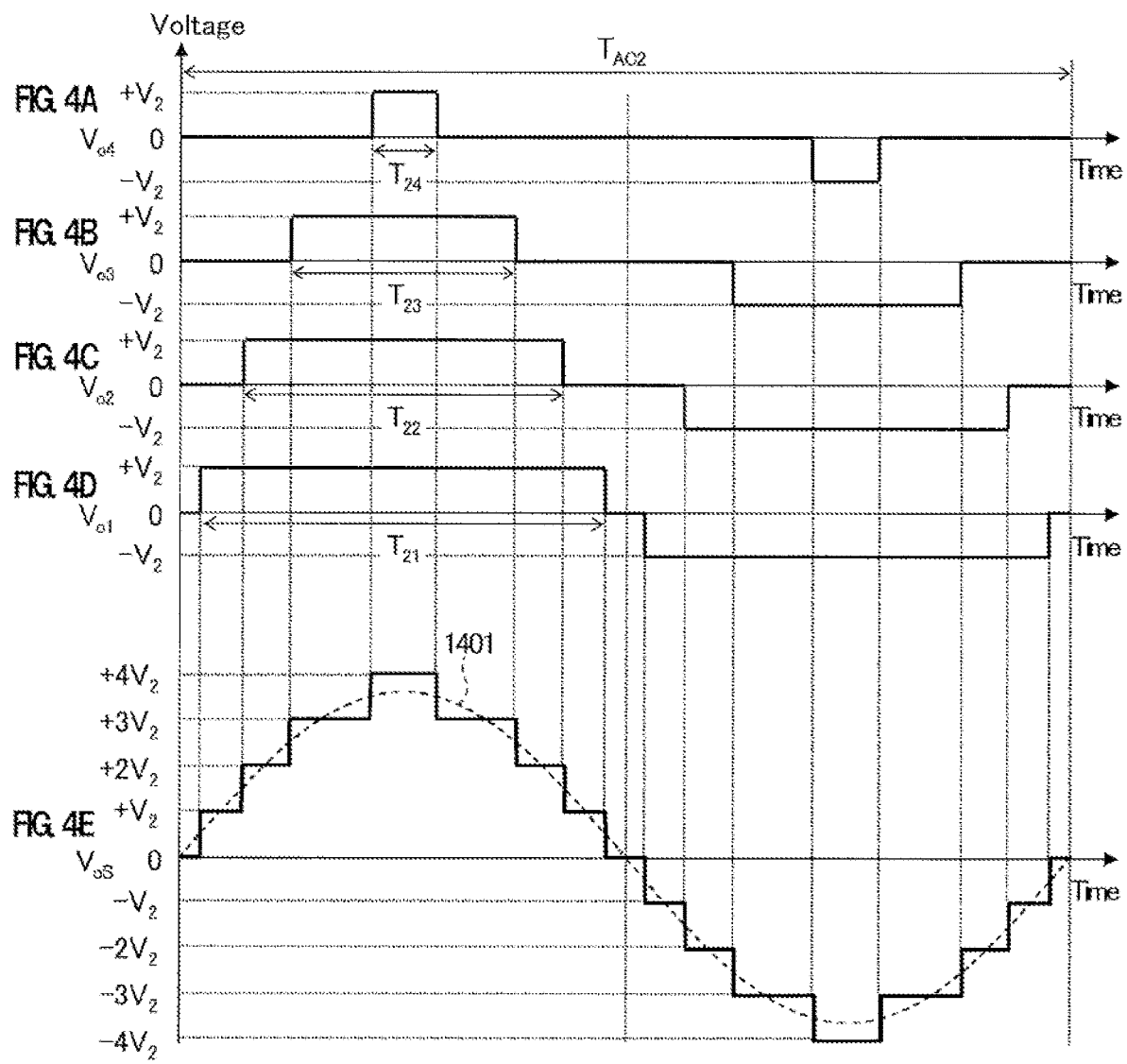
FIGS. 4A to 4E are charts illustrating an example of waveforms of the output voltages of respective power conversion cells in the power conversion device according to the first embodiment of the present invention and an example of the waveform of synthetic output voltage synthesized therefrom.

The dashed sine wave 1401, on which the synthetic output voltage $V_{oS}$ waveform is superimposed, of FIG. 4E is a basic wave component included in the synthetic output voltage $V_{oS}$. This basic wave component may be considered to be a target value for the synthetic output voltage $V_{oS}$.

Note that the synthetic output voltage $V_{oS}$ is a stepwise pseudo sine waveform (multi-level pseudo sine wave) and this waveform somehow deviates from a sine wave. However, when the output load is formed of motor-like coil components, the coil inductance effects make the current waveform sufficiently closer to a sine waveform in practice.

The secondary converters 191 to 194 of the secondary conversion units 121 to 124 in FIG. 1 have a diode bridge circuit including the diodes D21 to D24 as shown in FIG. 3. This means that the diodes are not controlled by the controller 300.

Because of this, the secondary DC link voltages $V_{d21}$ to $V_{d24}$ of the power conversion cells 101 to 104 are controlled to prescribed levels by the primary conversion units 111 to 114 (specifically, the primary inverters 181 to 184) included in the power conversion cells 101 to 104, respectively. Also, the secondary DC link voltages $V_{d21}$ to $V_{d24}$ are smoothed by the capacitors 201 to 204, respectively, of the secondary conversion units.

In addition, the respective target values of the secondary DC link voltages $V_{d21}$ to $V_{d24}$ may be different levels. Here, for description convenience, FIGS. 4A to 4E show a case where the target values of the secondary DC link voltages $V_{d21}$ to $V_{d24}$ are all the same $V_2$.

The secondary inverter 211 of the power conversion cell 101 generates either one of $+V_{d21}$ $(=+V_2)$, 0, or $-V_{d21}$ $(=-V_2)$ as an instantaneous level of the output voltage $V_{o1}$.

Because of this, the secondary inverter 211 can generate a positive or negative, pulsed output voltage $V_{o1}$ as shown in FIG. 4D. In addition, the amplitude (pulse peak value) of the output voltage $V_{o1}$ is $V_{d21}$ $(=V_2)$.

Further, the output voltages $V_{o1}$ to $V_{o4}$ of the power conversion cells 102 to 104 are also generated in the same fashion.

Because the output terminals of the power conversion cells 101 to 104 are connected in series, the synthetic output voltage $V_{oS}$ is the sum of the output voltages $V_{o1}$ to $V_{o4}$ of the power conversion cells 101 to 104. Accordingly, the multi-level pseudo sine wave-shaped synthetic output voltage $V_{oS}$ is generated as in FIG. 4E.

The number of levels of the synthetic output voltage $V_{oS}$ is 9 including positive and negative levels. The amplitude (peak value) of the synthetic output voltage $V_{oS}$ is $4V_2$. Meanwhile, the target value of the synthetic output voltage $V_{oS}$ is determined. Then, the power conversion cells 101 to 104 are controlled such that the basic wave component of the synthetic output voltage $V_{oS}$ to be output actually corresponds to the target value (the dashed line 1401 in FIG. 4E).

The synthetic output voltage $V_{oS}$ in FIG. 4E is not a perfect sinusoidal voltage but includes harmonic components in addition to the basic wave component. As the number of power conversion cells used increases, the number of levels of the synthetic output voltage $V_{oS}$ becomes larger and the harmonic components included in the synthetic output voltage $V_{oS}$ become small. At that time, harmonic components included in the output current $I_o$ also become small.

Here, in FIGS. 4A to 4D, the pulse widths of the output voltages $V_{o1}$ to $V_{o4}$ are defined as $T_{21}$ to $T_{24}$.

In the case of such definitions, the relationship is $T_{21}>T_{22}>T_{23}>T_{24}$. When attention is paid to the output powers of the respective power conversion cells 101 to 104, the order is power conversion cell 101>power conversion cell 102>power conversion cell 103>power conversion cell 104.

<<Input Voltage Waveforms of Respective Power Conversion Cells and Synthetic Input Voltage Waveform>>

FIGS. 5A to 5E are charts illustrating an example of waveforms of the input voltages $V_{i1}$ to $V_{i4}$ under a normal state of the respective power conversion cells 101 to 104 in the power conversion device 10 according to the first embodiment of the present invention and an example of the waveform of synthetic input voltage $V_{iS}$ synthesized therefrom.

In FIGS. 5A to 5E, the ordinate represents the input voltages $V_{i1}$ to $V_{i4}$, the synthetic input voltage $V_{iS}$, and the target values $V_1$ of the primary DC link voltages; and the abscissa is a time point or time (time course).

Figure 5:
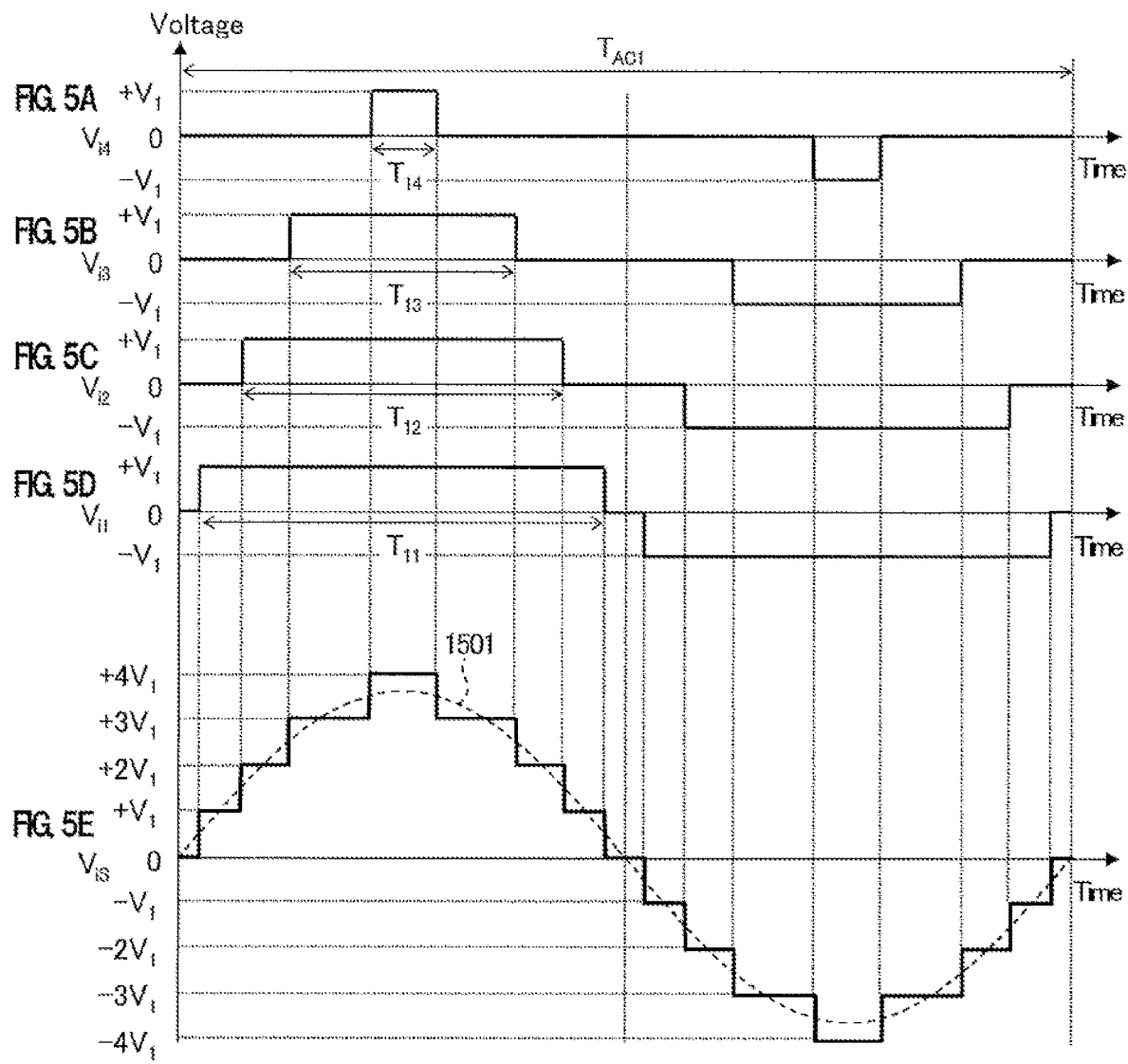
FIGS. 5A To 5E are charts illustrating an example of waveforms of the input voltages under a normal state of respective power conversion cells in the power conversion device according to the first embodiment of the present invention and an example of the waveform of synthetic input voltage $V_{iS}$ synthesized therefrom.
Figure 6:
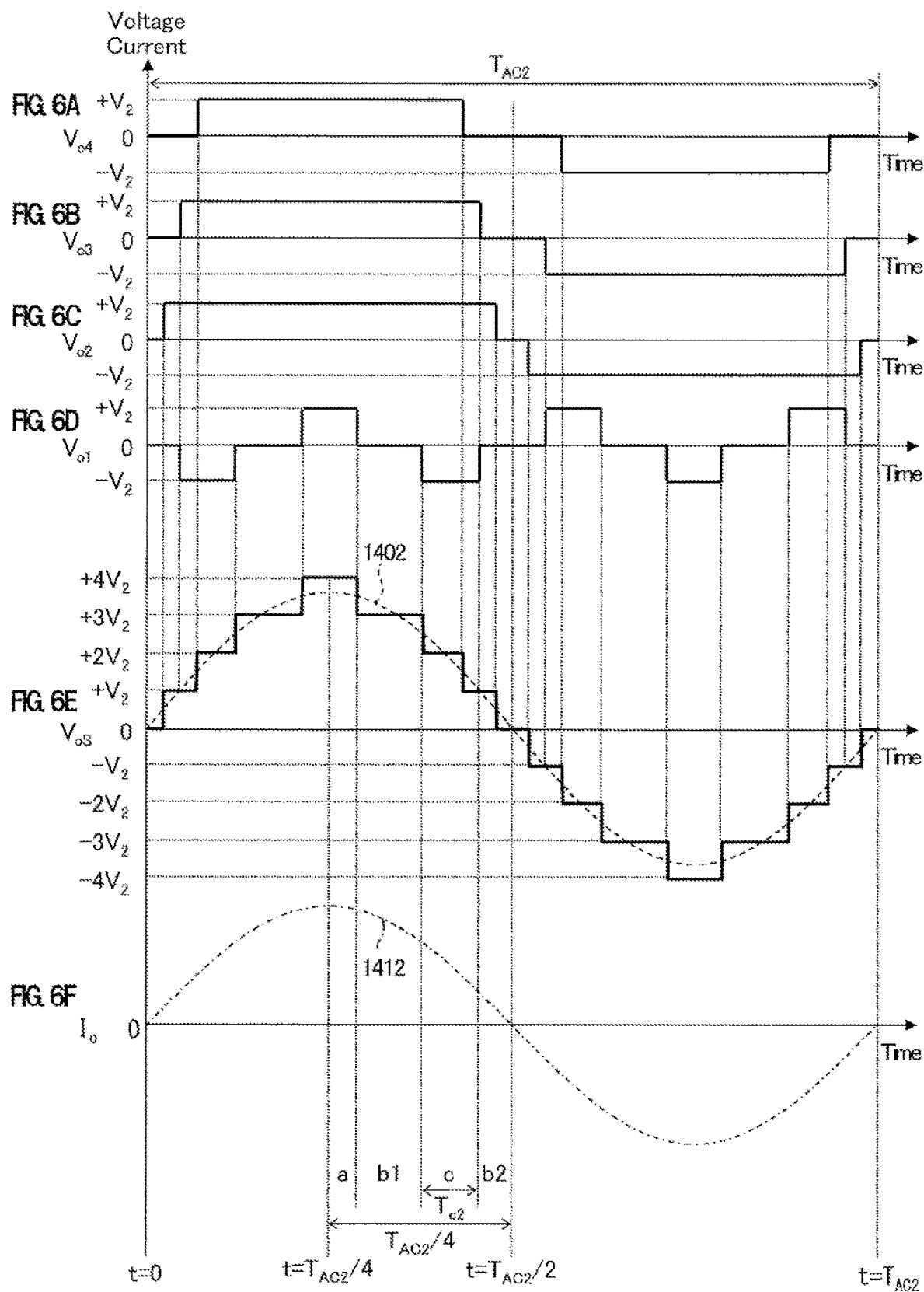
FIGS. 6A to 6F are charts illustrating an example of waveforms of the output voltages of respective power conversion cells, when a primary conversion unit is stopped, in the power conversion device according to the first embodiment of the present invention and an example of the waveform of synthetic output voltage synthesized therefrom.

In addition, FIG. 5E shows a waveform of one cycle of AC cycle $T_{AC1}$ of the power source 500.

The dashed sine wave 1501, on which the synthetic input voltage $V_{iS}$ waveform is superimposed, of FIG. 5E is a basic wave component included in the synthetic input voltage $V_{iS}$. This basic wave component may be considered to be a target value for the synthetic input voltage $V_{iS}$.

Note that the input voltages $V_{i1}$ to $V_{i4}$ of the power conversion cells 101 to 104 are controlled to control the given sine-wave-shaped amplitude and phase of the synthetic input voltage $V_{iS}$. This is because the input power of the power conversion device 10 is controlled to prescribed power.

In addition, the cycle $T_{AC2}$ of the synthetic output voltage $V_{oS}$ as shown in FIGS. 4A to 4E differs from the waveform cycle $T_{AC1}$ of the synthetic input voltage $V_{iS}$ as shown in FIGS. 5A to 5E. This is because the frequency ($1/T_{AC2}$) of the synthetic output voltage $V_{oS}$ can be newly generated in the secondary inverters 211 to 214.

The primary DC link voltages $V_{d11}$ to $V_{d14}$ of the power conversion cells 101 to 104 are controlled to prescribed levels by the primary conversion units 111 to 114 (specifically, the primary converters 161 to 164) included in the power conversion cells 101 to 104, respectively. In addition, the primary DC link voltages $V_{d11}$ to $V_{d14}$ are smoothed by the capacitors 171 to 174, respectively, of the primary conversion units.

The respective target values of the primary DC link voltages $V_{d11}$ to $V_{d14}$ may be different values. Here, for description convenience, FIGS. 5A to 5E show a case where the target values of the primary DC link voltages $V_{d11}$ to $V_{d14}$ are all the same $V_1$.

The primary converter 161 of the power conversion cell 101 generates either one of $+V_{d11}$ ($=+V_1$), 0, or $-V_{d11}$ ($-V_1$) as an instantaneous level of the input voltage $V_{i1}$.

Because of this, the primary converter 161 can generate a positive or negative, pulsed input voltage $V_{i1}$ as shown in FIG. 5D. Then, the amplitude (pulse peak value) of the input voltage $V_{i1}$ is $V_{d11}$ ($=V_1$). Further, the input voltages $V_{i2}$ to $V_{i4}$ of the power conversion cells 102 to 104 are also generated in the same fashion.

Because the respective input terminals of the power conversion cells 101 to 104 are connected in series, the synthetic input voltage $V_{iS}$ is the sum of the input voltages $V_{i1}$ to $V_{i4}$ of the power conversion cells 101 to 104. Accordingly, the multi-level pseudo sine wave-shaped synthetic output voltage $V_{iS}$ is generated as in FIG. 5E.

The number of levels of the synthetic input voltage $V_{iS}$ is 9 including positive and negative levels. Here, the voltage per level (step) is $V_1$.

As shown in FIG. 1, the reactor 400 is serially inserted into an input unit between the AC power source 500 and the power conversion device 10. As described above, the reactor 400 is used to adjust a voltage difference between the output of the AC power source 500 and the input of the power conversion device 10.

The controller 300, as described above, controls the amplitude and phase of the synthetic input voltage $V_{iS}$, thereby controlling power input from the power source 500 to the power conversion device 10. In addition, the controller 300 determines the target value of the synthetic input voltage $V_{iS}$. Then, the power conversion cells 101 to 104 are controlled such that the basic wave component of the synthetic input voltage $V_{iS}$ to be generated actually corresponds to the target value (the dashed line 1501 in FIG. 5E).

The synthetic input voltage $V_{iS}$ in FIG. 5E is not a perfect sinusoidal voltage but includes harmonic components in addition to the basic wave component. As the number of cells used increases, the number of levels of the synthetic input voltage $V_{iS}$ becomes larger and the harmonic components included in the synthetic input voltage $V_{iS}$ become small. At that time, harmonic components included in the input current $I_i$ also become small.

In FIGS. 5A to 5D, the pulse widths of the input voltages $V_{i1}$ to $V_{i4}$ are defined as $T_{11}$ to $T_{14}$.

The relationship is $T_{11}>T_{12}>T_{13}>T_{14}$. When attention is paid to the input powers of the power conversion cells 101 to 104, the order is power conversion cell 101>power conversion cell 102>power conversion cell 103>power conversion cell 104.

<About Control of Using the Rest Power Conversion Cells for Correction when One Power Conversion Cell is Stopped>

The following describes a method in which even if one power conversion cell is stopped due to, for instance, malfunction and maintenance, the rest other power conversion cells are controlled for correction, so that the power conversion device 10 can be continuously and smoothly operated while keeping substantially the same output power quality as in a normal state.

<How Power Conversion Device Works when Primary Conversion Unit of One Power Conversion Cell is to be Stopped>

The following describes how the power conversion device 10 works when the primary conversion unit 111 of one power conversion cell, for instance, the power conversion cell 101 is to be stopped due to, for instance, malfunction and/or maintenance.

First, the controller 300 turns on (short) the primary bypass device 141 of the power conversion cell 101 to be stopped. Meanwhile, the secondary bypass device 151 is turned off (in a nonshorting state, an open state) like in a normal state.

Next, the controller 300 control the secondary conversion unit 121 of the power conversion cell 101 such that the secondary DC link voltage $V_{d21}$, which is to be generated in the secondary conversion unit 121 of the power conversion cell 101, is controlled to a prescribed level $V_2$. Specifically, the secondary inverter 211 is controlled as described below.

As described above, the primary conversion unit 111 is stopped and the primary bypass device 141 is turned on. As a result, power is not input to the power conversion cell 101. Consequently, power is not supplied from the primary conversion unit 111 to the secondary conversion unit 121.

In addition, it is not possible for the primary conversion unit 111 to control, like in a normal state, the secondary DC link voltage $V_{d21}$. Meanwhile, the secondary inverter 211, as described below, causes the capacitor 201 to be charged and discharged, so that the secondary DC link voltage $V_{d21}$ is controlled to a prescribed level $V_2$ and this secondary DC link voltage $V_{d21}$ is used to continuously generate the output voltage $V_{o1}$. Further, the power conversion device 10 can continuously generate the synthetic output voltage $V_{oS}$ like in a normal state.

Next, the above operation is described in detail by referring to operation waveforms.

<<Output Voltage Waveforms and Synthetic Output Voltage Waveform when Primary Conversion Unit of Primary Conversion Cell is Stopped>>

FIGS. 6A to 6D are charts illustrating an example of waveforms of the output voltage $V_{o1}$ to $V_{o4}$ of the power conversion cells 101 to 104 when the primary conversion unit 111 in the power conversion device 10 according to the first embodiment of the present invention is stopped and an example of the waveform of synthetic output voltage $V_{oS}$ synthesized therefrom.

In FIGS. 6A to 6D, the ordinate represents the output voltages $V_{o1}$ to $V_{o4}$, the synthetic output voltage $V_{oS}$, and the target values $V_2$ of the secondary DC link voltages; and the abscissa is a time point or time (time course). Note that the signs of $T_{AC1}$ and $T_{AC2}$ may each denote a time point or may each denote a time and the time is then inversed to denote a cycle (AC cycle).

FIG. 6E shows a waveform during one cycle of AC cycle $T_{AC2}$ output from the power conversion device 10. During the above, a quarter cycle from time point $T_{AC2}/4$ to time point $T_{AC2}/2$ is a subject. Then, operation modes and sings a, b1, c, and b2 denoting durations (periods) are depicted.

The dashed sine wave 1402, on which the synthetic output voltage $V_{oS}$ waveform is superimposed, of FIG. 6E is a basic wave component included in the synthetic output voltage $V_{oS}$. This basic wave component may be considered to be a target value for the synthetic output voltage $V_{oS}$.

In addition, FIG. 6F also shows the waveform 1412 of output current $I_o$. Provided that harmonic components included in the output current $I_o$ are neglected and only the basic wave component is depicted.

Hereinafter, for description convenience, the output power factor of the power conversion device 10 is assumed to be about 1. Thus, when the basic wave component (the dashed line 1402 in FIG. 6E) of the synthetic output voltage $V_{oS}$ is positive, the output current $I_o$ is also positive. In a period from time point $T_{AC2}/4$ to time point $T_{AC2}/2$ of FIG. 6F, the output current $I_o$ (waveform 1412) is positive. Note that whether the polarity of the output current $I_o$ is positive or negative is as indicated by the arrows in FIG. 1.

<<How Secondary Inverter Works During Period a>>

In period a of FIGS. 6A to 6F, the controller 300 controls the secondary inverter 211 of the power conversion cell 101 such that the capacitor 201 is discharged. Specifically, the secondary inverter 211 is controlled such that the output voltage $V_{o1}$ is $+V_{d11}$ $(=+V_2)$.

Note that in the description of the voltage waveforms in FIGS. 6A to 6F, because the capacitor 201 has a sufficiently large electrostatic capacity, it is assumed that even if the capacitor 201 is discharged over period a, the secondary DC link voltage $V_{d21}$ does not decrease from $V_2$.

In period a, the synthetic output voltage $V_{oS}$ is controlled to $+4V_2$. Consequently, all the output voltages $V_{o1}$ to $V_{o4}$ of the power conversion cells 101 to 104 should be controlled to be positive $(+V_2)$.

In addition, period c of FIGS. 6A to 6F, as described below, is when charging is performed to restore lost charge after the capacitor 201 is discharged in period a of FIGS. 6A to 6F.

Figure 7:
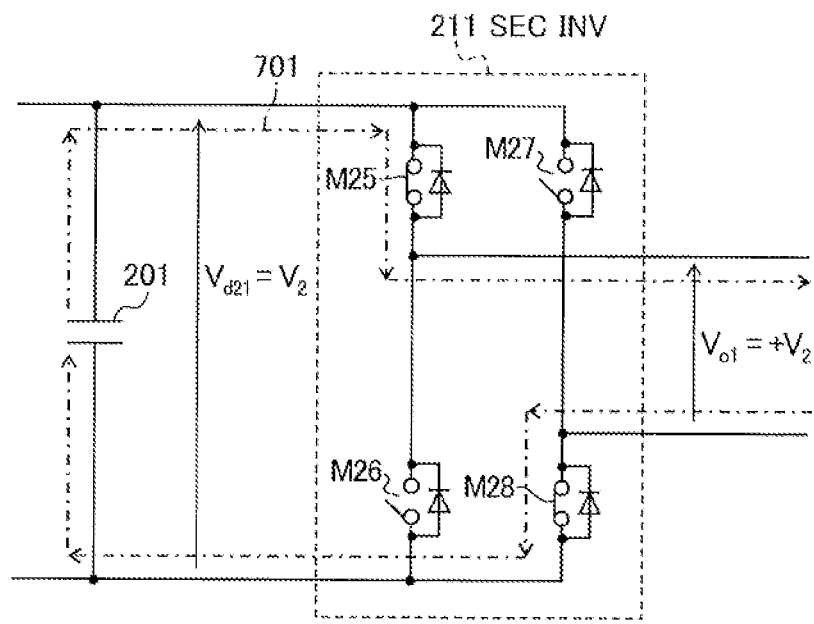
FIG. 7 is a diagram showing an example of how a circuit in a secondary inverter in a power conversion cell according to the first embodiment of the present invention is operated during period a of FIGS. 6A to 6F.

FIG. 7 is a diagram showing an example of how a circuit in the secondary inverter 211 in the power conversion cell 101 according to the first embodiment of the present invention is operated during period a of FIGS. 6A to 6F.

In FIG. 7, the switching elements M25 to M28 are simulated by ideal switches and antiparallel diodes. In addition, not only the secondary inverter 211 but also the capacitor 201 are shown. Further, the current path is denoted by the arrows of dashed-dotted line 701.

As illustrated in FIG. 7, the upper left switching element M25 and the lower right switching element M28 among the four switching elements M25 to 28 are turned on. Then, the output voltage $V_{o1}$ is positive $(+V_{d21}=+V_2)$ and a current flows through the capacitor 201 in a discharge direction.

<<How Secondary Inverter Works During Period b1>>

In period b1 of FIGS. 6A to 6F, the controller 300 controls the secondary inverter 211 such that the output voltage $V_{o1}$ of the power conversion cell 101 is 0. At that time, the capacitor 201 is neither charged nor discharged.

Thus, in period b1, the secondary DC link voltage $V_{d21}$ is not changed from $V_2$. In addition, in period b1, the synthetic output voltage $V_{oS}$ is controlled to $+3V_2$.

Although the output voltage $V_{o1}$ of the power conversion cell 101 is controlled to 0, all the output voltages $V_{o1}$ to $V_{o4}$ of the other power conversion cells 102 to 104 are controlled to be positive $(+V_2)$. Then, the synthetic output voltage $V_{oS}$ is $+3V_2$.

Figure 8:
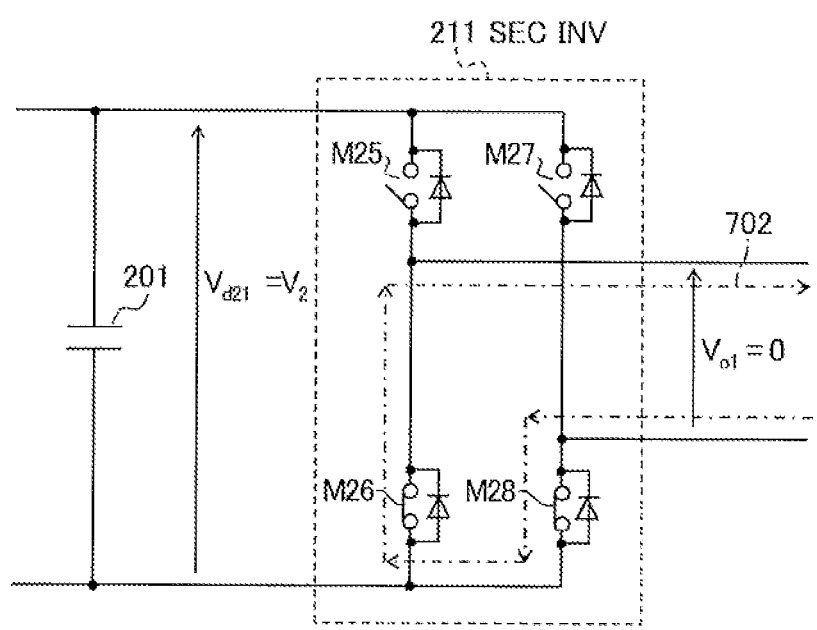
FIG. 8 is a diagram showing an example of how the circuit in a secondary inverter in a power conversion cell according to the first embodiment of the present invention is operated during period b1 of FIGS. 6A to 6F.

FIG. 8 is a diagram showing an example of how the circuit in the secondary inverter 211 in the power conversion cell 101 according to the first embodiment of the present invention is operated during period b1 of FIGS. 6A to 6F.

As shown in FIG. 8, the lower left switching element M26 and the lower right switching element M28 among the four switching elements M25 to M28 are turned on.

At that time, when voltage drops of the switching elements are neglected, the output voltage $V_{o1}$ is 0. In addition, no current flows through the capacitor 201.

<<How Secondary Inverter Works During Period c>>

In period c of FIGS. 6A to 6F, the controller 300 controls the secondary inverter 211 of the power conversion cell 101 such that the capacitor 201 is charged.

Specifically, the secondary inverter 211 is controlled such that the output voltage $V_{o1}$ is $-V_{d11}$ $(=-V_2)$. Meanwhile, in a period during which the output current $I_o$ is positive, the secondary inverter 211 outputs a negative voltage. Accordingly, the secondary inverter 211 regenerates power and the capacitor 201 is charged.

Note that in the description of the voltage waveforms in FIGS. 6A to 6F, because the capacitor 201 has a sufficiently large electrostatic capacity, it is assumed that even if the capacitor 201 is charged over period c, the secondary DC link voltage $V_{d21}$ does not increase from $V_2$.

Although the output voltage $V_{o1}$ of the power conversion cell 101 is negative $(-V_2)$ in period c, the output voltages $V_{o1}$ to $V_{o4}$ of the other power conversion cells are controlled to be 0 or positive $(+V_2)$. Then, the synthetic output voltage $V_{oS}$ can be controlled to be positive.

The synthetic output voltage $V_{oS}$ may be $+2V_2$ or less like in period c. In this case, even if the output voltage $V_{o1}$ of the power conversion cell 101 is controlled to be negative $(-V_2)$, the synthetic output voltage $V_{oS}$ can be controlled to the target value.

Figure 9:
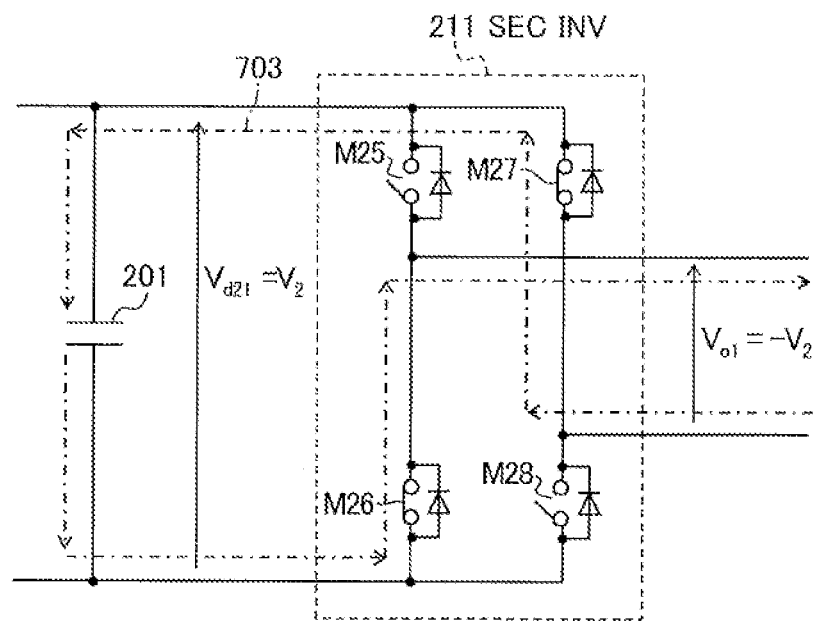
FIG. 9 is a diagram showing an example of how the circuit in a secondary inverter in a power conversion cell according to the first embodiment of the present invention is operated during period c of FIGS. 6A to 6F.

FIG. 9 is a diagram showing an example of how the circuit in the secondary inverter 211 in the power conversion cell 101 according to the first embodiment of the present invention is operated during period c of FIGS. 6A to 6F.

As illustrated in FIG. 9, the lower left switching element M26 and the upper right switching element M27 among the four switching elements M25 to 28 are turned on. Then, the output voltage $V_{o1}$ is negative $(-V_{d21}=-V_2)$ and a current flows through the capacitor 201 in a charge direction.

Note that in FIG. 9, if all the four switching elements M25 to M28 are turned off, a similar operation (current path) may be implemented by antiparallel diode operation.

<<How Secondary Inverter Works During Period b2>>

In period b2 of FIGS. 6A to 6F, the controller 300 controls, like in the above period b1, the secondary inverter 211 such that the output voltage $V_{o1}$ of the power conversion cell 101 is 0.

That is, an example of how the circuit in the secondary inverter 211 of the power conversion cell 101 is operated during period b2 of FIGS. 6A to 6F is the same as of FIG. 8 showing the circuit operation during period b1.

As such, the circuit operation during period b2 and the circuit operation during b1 in the secondary inverter 211 are the same. However, the synthetic output voltage $V_{oS}$ is different between period b2 and period b1 as shown in FIGS. 6A to 6F.

In period b2, the synthetic output voltage $V_{oS}$ is controlled to $+V_2$ or 0. Thus, the capacitor 201 can be charged like in period c. In this regard, however, it is necessary to control the charge and discharge of the capacitor 201 so as to maintain the secondary DC link voltage $V_{d21}$ at the target value $V_2$.

Consequently, when the level of the synthetic output voltage $V_{oS}$ is $+2V_2$ or less like in period b2, a period where the capacitor 201 is not charged occurs.

<Operation from Time Point 0 to Time Point $T_{AC2}$>

In a period from time point 0 to time point $T_{AC2}/4$ of FIGS. 6A to 6F, control is executed like the period from time point $T_{AC2}/4$ to time point $T_{AC2}/2$.

When the synthetic output voltage $V_{oS}$ is controlled to $+4V_2$, the controller 300 controls the secondary inverter 211 such that the capacitor 201 is discharged, specifically, the output voltage $V_{o1}$ is $+V_{d11}$ $(=+V_2)$.

In addition, when the synthetic output voltage $V_{oS}$ is controlled to $+3V_2$, the controller 300 controls the secondary inverter 211 such that the output voltage $V_{o1}$ is 0.

Further, when the synthetic output voltage $V_{oS}$ is controlled to 0 to $+^2V_2$, the controller 300 controls the secondary inverter 211 such that the capacitor 201 is charged, specifically, the output voltage $V_{o1}$ is $-V_{d11}$ $(=-V_2)$. Alternatively, the secondary inverter 211 is controlled such that the output voltage $V_{o1}$ is 0.

In a period from time point $T_{AC2}/2$ to time point $T_{AC2}$ of FIGS. 6A to 6F, the output current $I_o$ is negative.

When the output current $I_o$ is negative, the secondary inverter 211 is controlled such that the output voltage $V_{o1}$ is positive $(+V_{d21}=+V_2)$ and the capacitor 201 is charged.

The above FIGS. 7 to 9 illustrate circuit operations when the output current $I_o$ is positive. The following describes an example of how the circuit of the secondary inverter 211 works when the output current $I_o$ is negative and the capacitor 201 is charged like in the period from time point $T_{AC2}/2$ to time point $T_{AC2}$.

Figure 10:
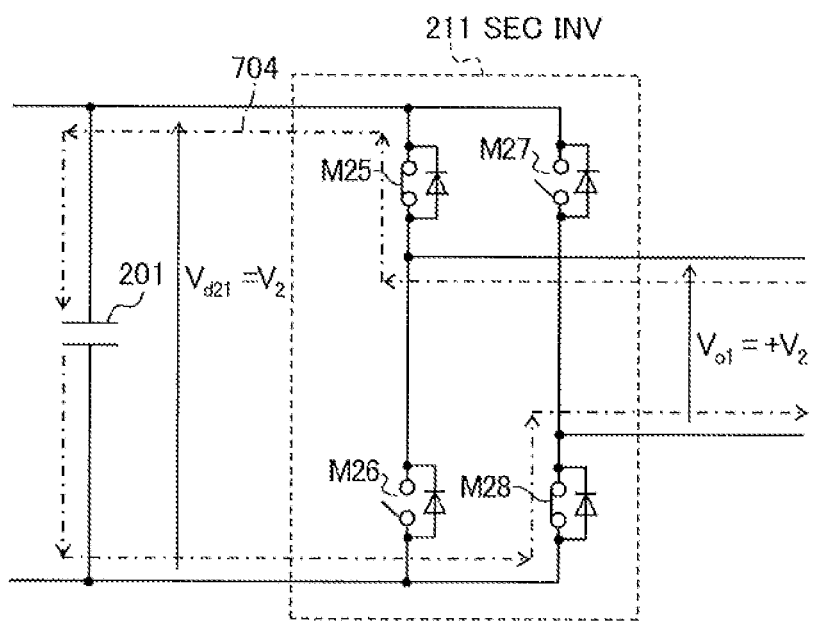
FIG. 10 is a diagram showing an example of how the circuit in a secondary inverter is operated when the power conversion device according to the first embodiment of the present invention has a negative output current and a capacitor of the power conversion cell is charged.
Figure 11:
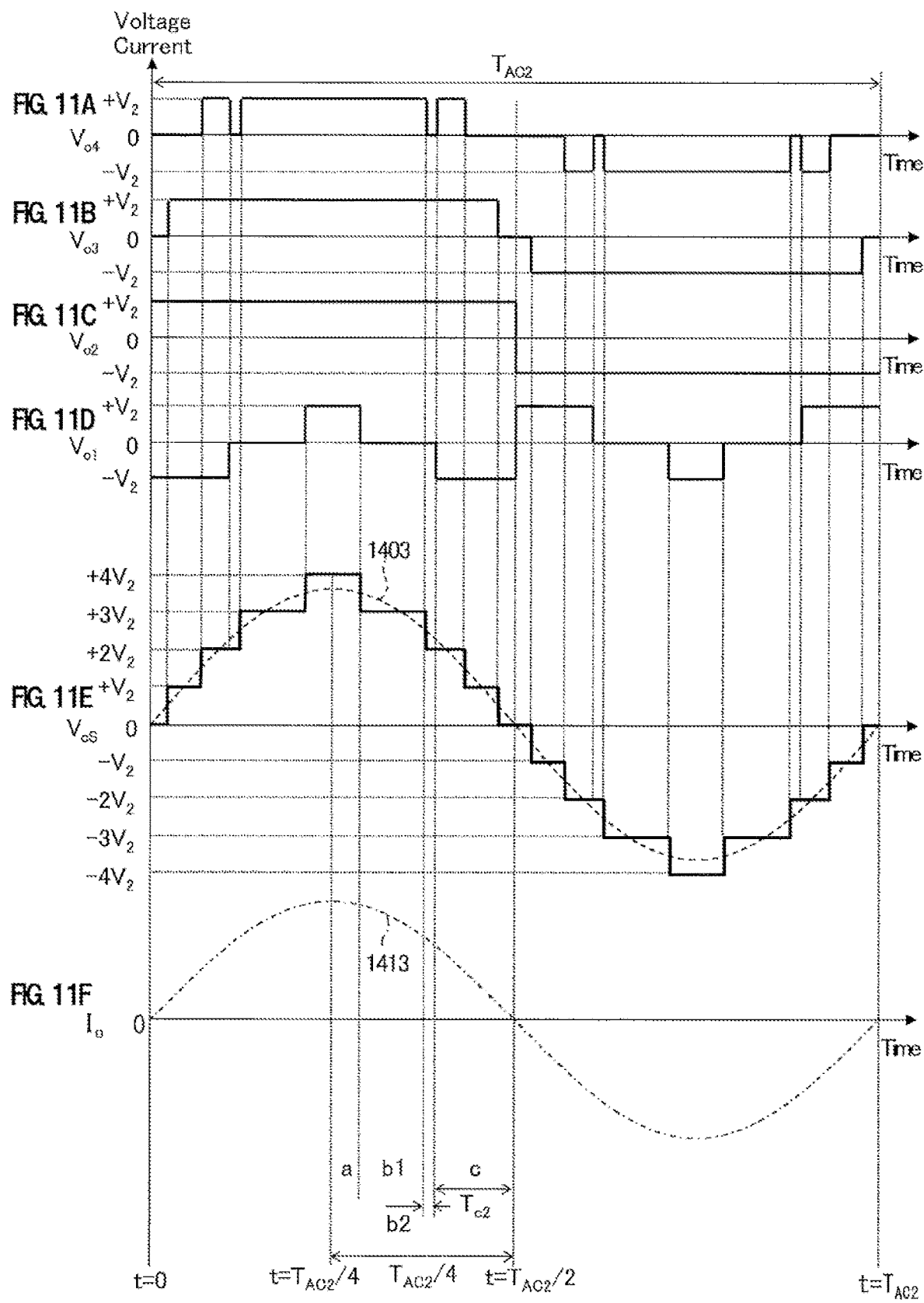
FIGS. 11A to 11F are charts illustrating another example of waveforms of the output voltages of respective power conversion cells, when a primary conversion unit is stopped, in the power conversion device according to the first embodiment of the present invention and another example of the waveform of synthetic output voltage synthesized therefrom.
Figure 12:
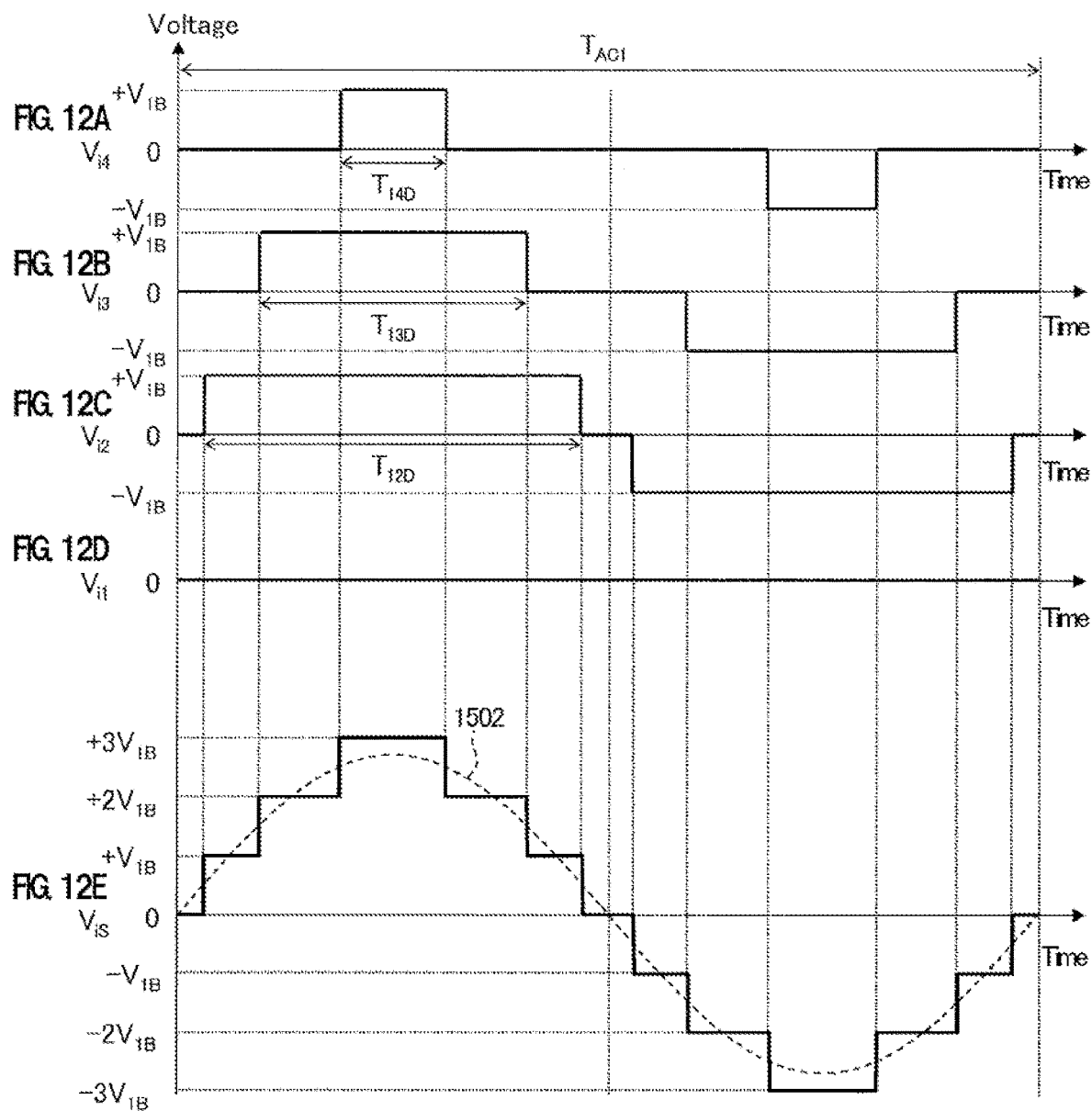
FIGS. 12A to 12E are charts illustrating an example of waveforms of the input voltages of respective power conversion cells when a primary conversion unit in a power conversion cell according to the first embodiment of the present invention is stopped and an example of the waveform of synthetic input voltage $V_{iS}$ synthesized from these input voltages.

FIG. 10 is a diagram showing an example of how the circuit in the secondary inverter 211 is operated when the power conversion device 10 according to the first embodiment of the present invention has a negative output current $I_o$ and the capacitor 201 of the power conversion cell 101 is charged.

As illustrated in FIG. 10, the upper left switching element M25 and the lower right switching element M28 among the four switching elements M25 to 28 are turned on. Then, the output voltage $V_{o1}$ is positive $(+V_{d21}=+V_2)$ and a current flows through the capacitor 201 in a charge direction.

Note that in FIG. 10, if all the four switching elements M25 to M28 are turned off, a similar operation (current path) may be implemented by antiparallel diode operation.

<<Another Example of Output Voltage Waveforms and Synthetic Output Voltage Waveform when Primary Conversion Unit of Primary Conversion Cell is Stopped>>

FIGS. 11A to 11F are charts illustrating another example of waveforms of the output voltage $V_{o1}$ to $V_{o4}$ of the power conversion cells 101 to 104 when the primary conversion unit 111 in the power conversion device 10 according to the first embodiment of the present invention is stopped and another example of the waveform of synthetic output voltage $V_{oS}$ synthesized therefrom.

In FIGS. 11A to 11F, the ordinate represents the output voltages $V_{o1}$ to $V_{o4}$, the synthetic output voltage $V_{oS}$, and the target values $V_2$ of the secondary DC link voltages; and the abscissa is a time point or time (time course).

In addition, FIG. 11E shows a waveform during one cycle of AC cycle $T_{AC2}$ output from the power conversion device 10. During the above, a quarter cycle from time point $T_{AC2}/4$ to time point $T_{AC2}/2$ is a subject. Then, operation modes and sings a, b1, b2, and c denoting durations (periods) are depicted.

The periods a, b1, b2, and c in FIGS. 11A to 11F and the periods a, b1, c, and b2 in FIGS. 6A to 6F are compared. Here, the period c where the capacitor 201 is charged and the period b2 where the capacitor 201 is not charged are switched in the order.

In addition, the dashed sine wave 1403, on which the synthetic output voltage $V_{oS}$ waveform is superimposed, of FIG. 11E is a basic wave component included in the synthetic output voltage $V_{oS}$. This basic wave component may be considered to be a target value for the synthetic output voltage $V_{oS}$.

In addition, FIG. 11F also shows the waveform 1413 of output current $I_o$. Provided that harmonic components included in the output current $I_o$ are neglected and only the basic wave component is depicted.

As described above, the controller 300 operates the secondary inverter 211 in view of both controlling the secondary DC link voltage $V_{d21}$ of the power conversion cell 101 to a prescribed voltage and controlling the synthetic output voltage $V_{oS}$ to a target value.

This control causes the synthetic output voltage $V_{d21}$ to be kept at a prescribed voltage as well as the secondary DC link voltage $V_{d21}$ can be used to continuously generate the output voltage $V_{o1}$ and the synthetic output voltage $V_{oS}$.

<<Input Voltage Waveforms and Synthetic Input Voltage Waveform when Primary Conversion Unit of Primary Conversion Cell is Stopped>>

FIGS. 12A to 12E are charts illustrating an example of waveforms of the input voltages $V_{i1}$ to $V_{i4}$ of the respective power conversion cells 101 to 104, when the primary conversion unit 111 is stopped, in the power conversion cell 101 according to the first embodiment of the present invention and an example of the waveform of synthetic input voltage $V_{iS}$ synthesized from these input voltages.

In FIGS. 12A to 12E, the ordinate represents the input voltages $V_{i1}$ to $V_{i4}$, the synthetic input voltage $V_{iS}$, and the target values $V_{1B}$ of the primary DC link voltages; and the abscissa is a time point or time (time course).

In addition, FIG. 12E shows a waveform of one cycle of AC cycle $T_{AC1}$ of the power source 500.

The dashed sine wave 1502, on which the synthetic input voltage $V_{iS}$ waveform is superimposed, of FIG. 12E is a basic wave component included in the synthetic input voltage $V_{iS}$. This basic wave component may be considered to be a target value for the synthetic input voltage $V_{iS}$.

As shown in FIG. 12D, the primary bypass device 141 of the power conversion cell 101 is turned on; and thus, the input voltage $V_{i1}$ of the power conversion cell 101 is 0.

In addition, the power conversion cells 102 to 104 generate negative or positive pulsed input voltages $V_{i2}$ to $V_{i4}$ like in a normal state. In this regard, however, the amplitudes and pulse widths of the pulsed waveforms are changed, compared to those of pulses in a normal state. In FIGS. 12A to 12C, the amplitudes of the input voltages $V_{i2}$ to $V_{i4}$ are each changed from $V_1$ to $V_{1B}$, for instance.

Note that the amplitudes of the input voltages $V_{i2}$ to $V_{i4}$ are each changed from $V_1$ to $V_{1B}$ by the primary conversion units 112 to 114.

That is, the controller 300 calculates, in terms of the input voltages $V_{i2}$ to $V_{i4}$, the target values of the primary DC link voltages $V_{d12}$ to $V_{d14}$, which are controlled by the primary conversion units 112 to 114 of the power conversion cells 102 to 104. Then, each target value is enlarged and changed from $V_1$ to $V_{1B}$. When the primary DC link voltages $V_{d12}$ to $V_{d14}$ are changed, the input voltages $V_{i2}$ to $V_{i4}$ are also changed.

As shown in FIGS. 12A to 12D, the input voltages $V_{i1}$ to $V_{i4}$ of the power conversion cells 101 to 104 are synthesized to generate a multi-level pseudo sine wave-shaped synthetic input voltage $V_{iS}$. Note that the number of levels of the synthetic input voltage $V_{iS}$ including positive and negative levels are decreased from 9 (FIGS. 5A to 5E), which is the number of levels in a normal state, to 7 (FIG. 12E) levels. Provided that if control is executed to keep the relationship $3V_{1B}=4V_1$, it is possible to substantially keep equal the amplitudes of the multi-level pseudo sine waves in a normal state shown in FIG. 5E and in a state in which the primary conversion unit 111 of the power conversion cell 101 is stopped as shown in FIG. 12D.

In this way, even if the number of levels of the synthetic input voltage $V_{iS}$ waveform is smaller than in a normal state, the amplitude of the basic wave component (dashed line 1502 in FIG. 12E) of the synthetic input voltage $V_{iS}$ is maintained and the power conversion device 10 can thus be continuously operated.

Note that when the primary conversion unit 111 in the power conversion cell 101 is stopped, the AC voltage of the external AC power source 500 is not changed. As described above, the reactor 400 executes adjustment between the AC voltage of the external AC power source 500 and the newly constructed multi-level pseudo sine wave-shaped synthetic input voltage $V_{iS}$.

<Supplementary Information about Case where Primary Conversion Unit of One Power Conversion Cell is to be Stopped>

In view of the above, even when the primary conversion unit 111 of the power conversion cell 101 is to be stopped due to, for instance, malfunction and/or maintenance, the power conversion device 10 can be smoothly and continuously operated by using sound elements including the secondary conversion unit 121 of the power conversion cell 101.

In addition, when the primary conversion unit of another power conversion cell is to be stopped, control is executed in the same fashion, so that the operation can be smoothly continued by using sound elements including the secondary conversion unit of the power conversion cell, the primary conversion unit of which is to be stopped.

As described above, by operating the secondary conversion unit of the power conversion cell having the primary conversion unit stopped, the amplitude of the synthetic output voltage $V_{oS}$ can be kept, without increasing the secondary DC link voltage, at the same magnitude as in a normal state.

Accordingly, if the load 600 is a motor, the operation can be continued without impairing the rotational speed range. In addition, the number of levels of the synthetic output voltage $V_{oS}$ and the voltage per level are the same as in a normal state. Hence, neither harmonic components of the output current nor electromagnetic noise generated in the secondary conversion unit increases. If the load 600 is a motor as described above, this is effective in view of suppressing motor deterioration.

<How Power Conversion Device Works when Secondary Conversion Unit of One Power Conversion Cell is to be Stopped>

The following describes how the power conversion device 10 works when the secondary conversion unit 121 of one power conversion cell 101 is to be stopped due to, for instance, malfunction and/or maintenance.

In FIG. 1, the controller 300 turns on the secondary bypass device 151 of the power conversion cell 101 to be stopped. Meanwhile, the primary bypass device 141 is turned off like in a normal state.

Next, the controller 300 controls the primary conversion unit 111 of the power conversion cell 101 such that the primary DC link voltage $V_{d11}$, which is to be generated in the primary conversion unit 111 of the power conversion cell 101, is controlled to a prescribed level $V_1$. Specifically, the primary converter 161 is controlled.

The secondary conversion unit 121 is stopped and the secondary bypass device 151 is turned on. As a result, power cannot be output from the power conversion cell 101. Accordingly, the capacitor 171 cannot be discharged by transferring power from the primary conversion unit 111 to the secondary conversion unit 121 like in a normal state.

Even in such a state, the primary converter 161 controls charge and discharge of the capacitor 171 to control the primary DC link voltage $V_{d11}$ to a prescribed level $V_1$ as described below. Also, the primary converter 161 uses the primary DC link voltage $V_{d11}$ to continuously generate the input voltage $V_{i1}$. Further, the power conversion device 10 continuously generates the synthetic output voltage $V_{oS}$ like in a normal state.

<Input Voltage Waveforms and Synthetic Input Voltage Waveform when Secondary Conversion Unit of Power Conversion Cell is Stopped>

The following describes waveforms of the input voltages $V_{i1}$ to $V_{i4}$ of the respective power conversion cells 101 to 104 when the secondary conversion unit 121 in the power conversion cell 101 is stopped and the waveform of synthetic input voltage $V_{iS}$ synthesized therefrom.

Note that even when the secondary conversion unit 121 is to be stopped, it is necessary to control the primary conversion unit 111 so as to make a primary flowing current flow at a prescribed current value and to control the primary conversion unit 111 so as to keep prescribed primary power.

FIGS. 13A to 13F are charts illustrating an example of waveforms of the input voltages $V_{i1}$ to $V_{i4}$ of the respective power conversion cells 101 to 104 when the secondary conversion unit 121 in the power conversion cell 101 according to the first embodiment of the present invention is stopped and an example of the waveform of synthetic input voltage $V_{iS}$ synthesized from these input voltages.

In FIGS. 13A to 13D, the ordinate represents the input voltages $V_{i1}$ to $V_{i4}$, the synthetic input voltage $V_{iS}$, and the target values $V_1$ of the primary DC link voltages; and the abscissa is a time point or time (time course).

Figure 13:
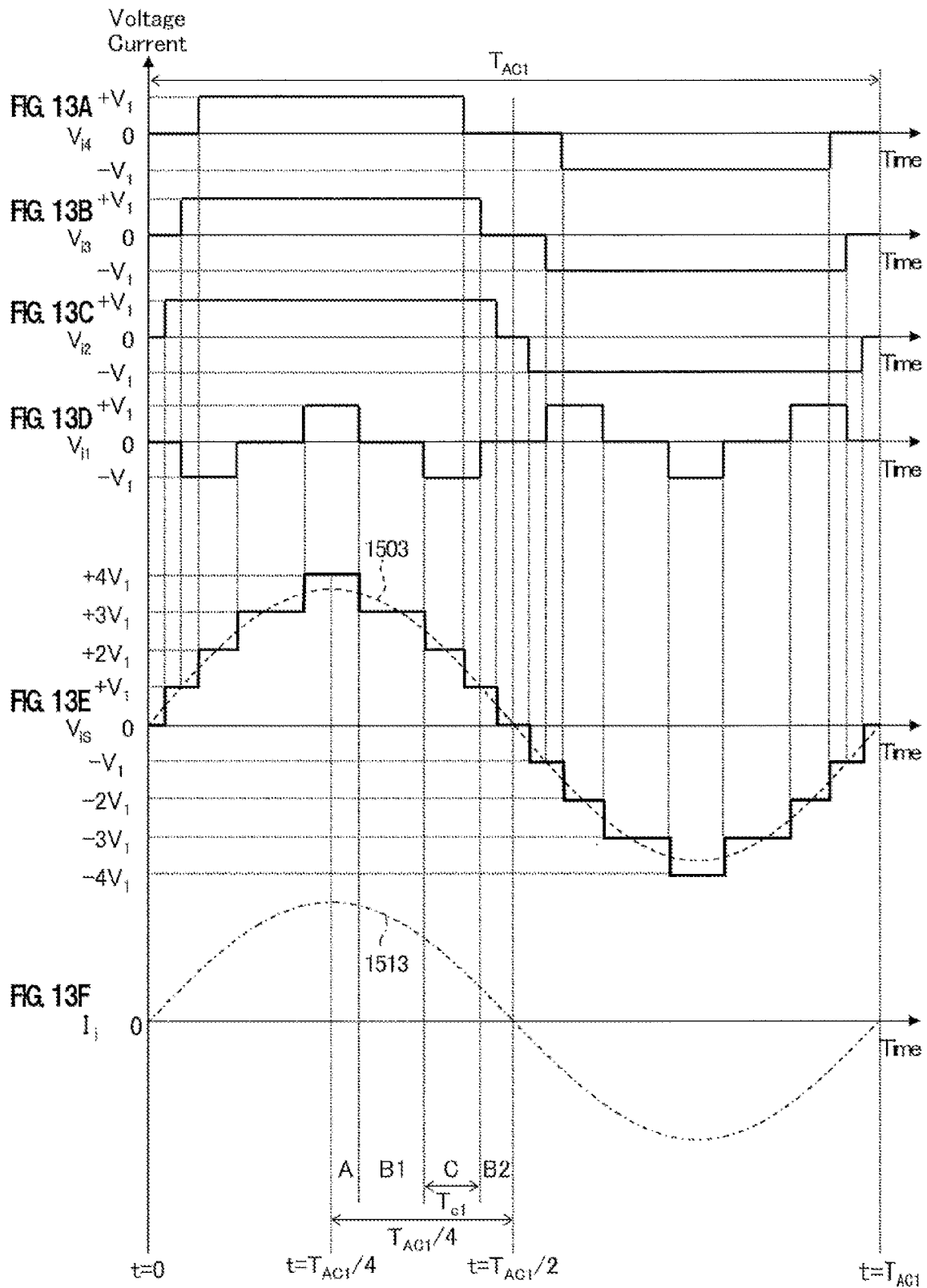
FIGS. 13A to 13F are charts illustrating an example of waveforms of the input voltages V of respective power conversion cells when a secondary conversion unit in a power conversion cell according to the first embodiment of the present invention is stopped and an example of the waveform of synthetic input voltage synthesized from these input voltages.

In addition, FIG. 13E shows a waveform of one cycle of AC cycle $T_{AC1}$ of the power source 500. During the above, a quarter cycle from time point $T_{AC1}/4$ to time point $T_{AC1}/2$ is a subject. Then, operation modes and sings A, B1, C, and B2 denoting durations are depicted.

The dashed sine wave 1503, on which the synthetic input voltage $V_{iS}$ waveform is superimposed, of FIG. 13E is a basic wave component included in the synthetic input voltage $V_{iS}$. This basic wave component may be considered to be a target value for the synthetic input voltage $V_{iS}$.

In addition, FIG. 13F also shows the waveform 1513 of input current $I_i$. Provided that harmonic components included in the input current $I_i$ are neglected and only the basic wave component is depicted.

Hereinafter, for description convenience, the output power factor of the power conversion device 10 is assumed to be about 1. Thus, when the basic wave component (the dashed line 1503 in FIG. 13E) of the synthetic input voltage $V_{iS}$ is positive, the input current $I_i$ is also positive. In a period from time point $T_{AC1}/4$ to time point $T_{AC1}/2$ of FIGS. 13A to 13F, the input current $I_i$ (waveform 1513) is positive. Note that whether the polarity of the input current $I_i$ is positive or negative is as indicated by the arrows in FIG. 1.

<<Control of Controller in Period a of FIGS. 13A to 13F>>

In period A shown in FIGS. 13A to 13F, the controller 300 (FIG. 1) controls the primary converter 161 (FIG. 1) of the power conversion cell 101 (FIG. 1) so as to charge the capacitor 171 (FIG. 1). Specifically, the primary converter 161 is controlled such that the input voltage $V_{i1}$ is $+V_{d11}$ (+$V_1$).

Note that in FIGS. 13A to 13F, the electrostatic capacity of the capacitor 171 is sufficiently large, and even if the capacitor 171 is charged in period A, it is assumed that the primary DC link voltage $V_{d11}$ is not increased from $V_1$.

In period A, the synthetic input voltage $V_{iS}$ is controlled to $+4V_1$. To achieve this, all the input voltages $V_{i1}$ to $V_{i4}$ of the respective power conversion cells should be controlled to be positive (+$V_1$).

<<How to Operate Circuit of Primary Converter in Period a of FIGS. 13A to 13F>>

Figure 14:
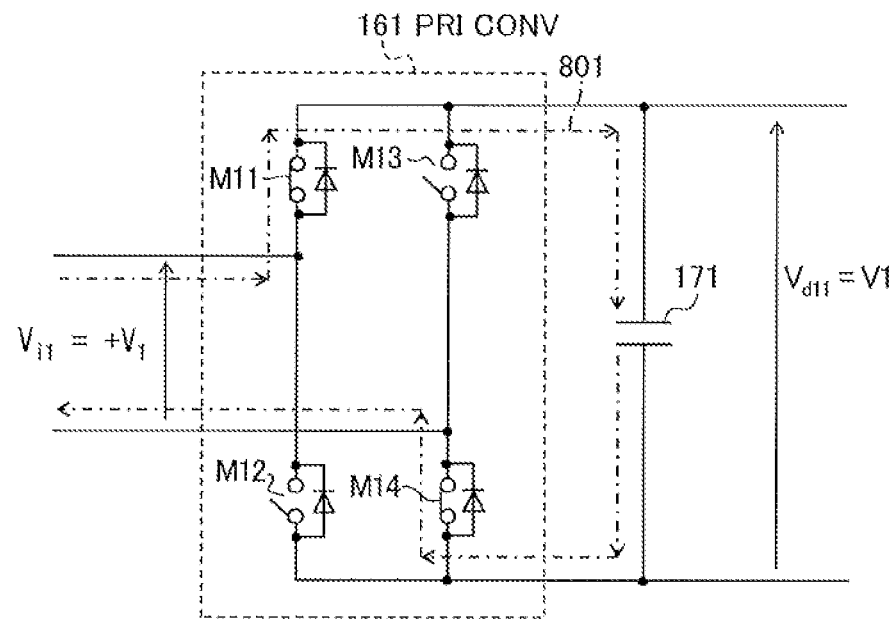
FIG. 14 is a diagram showing an example of how a circuit in a primary inverter in a power conversion cell according to the first embodiment of the present invention is operated during period A of FIGS. 13A to 13F.

FIG. 14 is a diagram showing an example of how a circuit in the primary converter 161 in the power conversion cell 101 according to the first embodiment of the present invention is operated during period A of FIGS. 13A to 13F.

In FIG. 14, the switching elements M11 to M14, including, for instance, MOSFETs, are represented by and simulated with ideal switches and antiparallel diodes.

In addition, not only the primary converter 161 but also the capacitor 171 are shown. In FIG. 14, the current path is denoted by the arrows of dashed-dotted line 801.

As illustrated in FIG. 14, the upper left switching element M11 and the lower right switching element M14 among the four switching elements M11 to 14 are turned on. Then, the input voltage $V_{i1}$ is positive (+$V_{d11}$=+$V_1$) and a current flows through the capacitor 171 in a charge direction. Note that if all the switching elements M11 to M14 are turned off, a similar operation may be implemented by antiparallel diode operation.

<<How to Operate Circuit of Primary Converter in Period B1 of FIGS. 13A to 13F>>

In period B1 of FIGS. 13A to 13F, the controller 300 controls the primary converter 161 such that the input voltage $V_{i1}$ of the power conversion cell 101 is 0. At that time, because the input voltage $V_{i1}$ is 0, the capacitor 171 is neither charged nor discharged. Thus, in period B1, the primary DC link voltage $V_{d11}$ is not changed.

However, even if the input voltage $V_{i1}$ of the power conversion cell 101 is controlled to 0, the synthetic input voltage $V_{iS}$ is controlled to $+3V_1$ in period B1. To achieve this, all the input voltages $V_{i2}$ to $V_{i4}$ of the other power conversion cells 102 to 104 should be controlled to be positive (+$V_1$). This control causes the synthetic input voltage $V_{iS}$ to be $+3V_1$.

Figure 15:
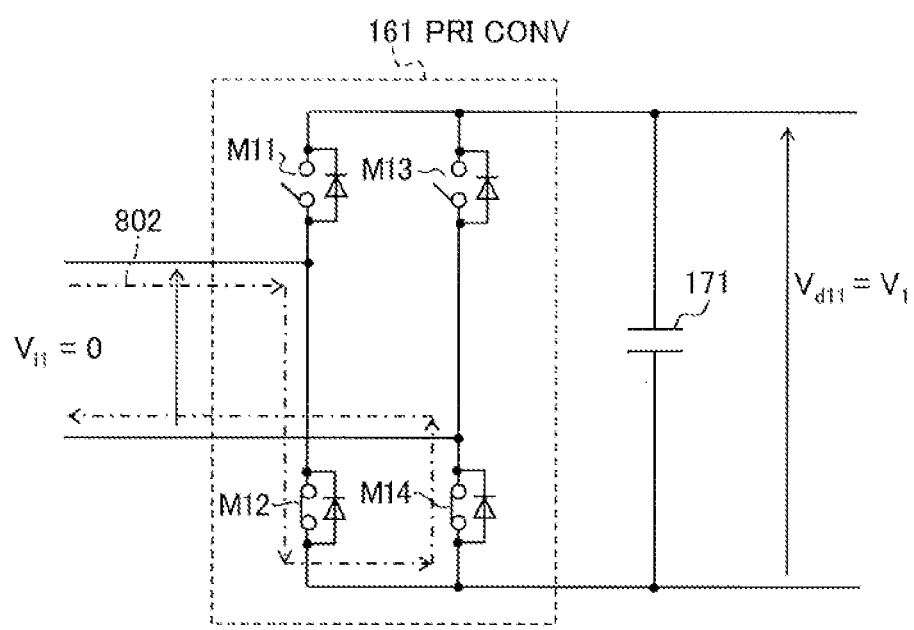
FIG. 15 is a diagram showing an example of how the circuit in a primary inverter in a power conversion cell according to the first embodiment of the present invention is operated during period B1 of FIGS. 13A to 13F.

FIG. 15 is a diagram showing an example of how the circuit in the primary converter 161 in the power conversion cell 101 according to the first embodiment of the present invention is operated during period B1 of FIGS. 13A to 13F.

As shown in FIG. 15, the lower left switching element M12 and the lower right switching element M14 among the four switching elements M11 to M14 are turned on. When voltage drops of the switching elements (M12 and M14) are neglected, the input voltage $V_{i1}$ is 0. In addition, no current flows through the capacitor 171.

Note that when the upper left switching element M11 and the upper right switching element M13 among the four switching elements M11 to M14 are turned on, the input voltage $V_{i1}$ is likewise 0.

<<How to Operate Circuit of Primary Converter in Period C of FIGS. 13A to 13F>>

In period C shown in FIGS. 13A to 13F, the controller 300 (FIG. 1) controls the primary converter 161 (FIG. 1) of the power conversion cell 101 (FIG. 1) so as to discharge the capacitor 171 (FIG. 1). Specifically, the primary converter 161 is controlled such that the input voltage $V_{i1}$ is $-V_{d11}$ (=-$V_1$).

In a period during which the input current $I_i$ is positive, the primary converter 161 generates a negative input voltage $V_{i1}$. Accordingly, the primary converter 161 regenerates power to the power source 500 and the capacitor 171 is discharged. Note that in FIGS. 13A to 13F, the electrostatic capacity of the capacitor 171 is sufficiently large, and even if the capacitor 171 is discharged over period C, it is assumed that the primary DC link voltage $V_{d11}$ is not decreased from $V_1$.

Although the input voltage $V_{i1}$ of the power conversion cell 101 is negative (-$V_1$) in period C, the input voltages $V_{i2}$ to $V_{i4}$ of the other power conversion cells 102 to 104 are controlled to be 0 or positive (+$V_1$). Then, the synthetic input voltage $V_{iS}$ can be controlled to be 0 or positive.

The synthetic input voltage $V_{iS}$ may be $+2V_1$ or less like in period C. In this case, even if the input voltage $V_{i1}$ of the power conversion cell 101 is controlled to be negative (-$V_1$), the synthetic input voltage $V_{iS}$ can be controlled to the target value.

Figure 16:
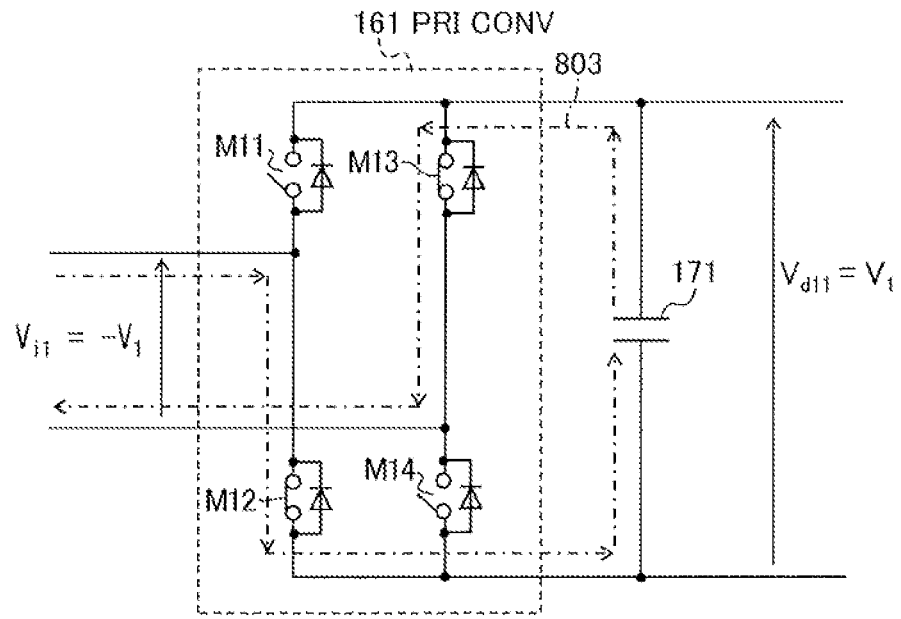
FIG. 16 is a diagram showing an example of how the circuit in a primary inverter in a power conversion cell according to the first embodiment of the present invention is operated during period C of FIGS. 13A to 13F.

FIG. 16 is a diagram showing an example of how the circuit in the primary converter 161 in the power conversion cell 101 according to the first embodiment of the present invention is operated during period C of FIGS. 13A to 13F.

As illustrated in FIG. 16, the lower left switching element M12 and the upper right switching element M13 among the four switching elements M11 to 14 are turned on. Then, the input voltage $V_{i1}$ is negative (-$V_{d11}$=-$V_1$) and a current 803 flows through the capacitor 171 in a discharge direction.

<<How to Operate Circuit of Primary Converter in Period B2 of FIGS. 13A to 13F>>

In period B2 shown in FIGS. 13A to 13F, the controller 300 controls, like in the above period B1, the primary converter 161 such that the input voltage $V_{i1}$ of the power conversion cell 101 is 0.

That is, an example of how the primary converter 161 of the power conversion cell 101 works during period B2 of FIGS. 13A to 13F is the same as of FIG. 15 showing the circuit operation during period B1.

In period B2, the synthetic input voltage $V_{iS}$ is $+V_1$ or 0. Thus, the capacitor 171 can be discharged like in period B1. But, it is necessary to control charge and discharge of the capacitor 171 so as to keep the primary DC link voltage $V_{d11}$ at the target value $V_1$.

Consequently, when the synthetic input voltage $V_{iS}$ is $+2V_1$ or less like in period B2, a period where the capacitor 171 is not discharged occurs.

<<How to Operate Circuit of Primary Converter in Period from 0 to $T_{AC1}/4$ of FIGS. 13A to 13F>>

In a period from time point 0 to time point $T_{AC1}/4$ of FIGS. 13A to 13F, control is executed like the period from time point $T_{AC1}/4$ to time point $T_{AC1}/2$.

When the synthetic input voltage $V_{iS}$ is controlled to $+4V_1$, the controller 300 executes control such that the capacitor 171 is charged.

Specifically, the primary converter 161 is controlled such that the input voltage $V_{i1}$ is $+V_{d11}$ ($=+V_1$).

When the synthetic output voltage $V_{iS}$ is controlled to $+3V_1$, the controller 300 controls the primary converter 161 such that the input voltage $V_{i1}$ is 0.

When the synthetic input voltage $V_{iS}$ is controlled to 0 to $+2V_1$, the controller 300 causes the capacitor 171 to be discharged. Specifically, the primary converter 161 is controlled such that the input voltage $V_{i1}$ is $-V_{d11}$ ($=-V_1$) or the primary converter 161 is controlled such that the input voltage $V_{i1}$ is 0.

<<How to Operate Circuit of Primary Converter in Period from $T_{AC1}/2$ to $T_{AC1}$ of FIGS. 13A to 13F>>

In a period from time point $T_{AC1}/2$ to time point $T_{AC1}$ of FIGS. 13A to 13F, the input current L is negative. When the input current L is negative, the primary converter 161 is controlled such that the input voltage $V_{i1}$ is positive ($+V_{d11}=+V_1$) and the capacitor 171 is discharged.

Figure 17:
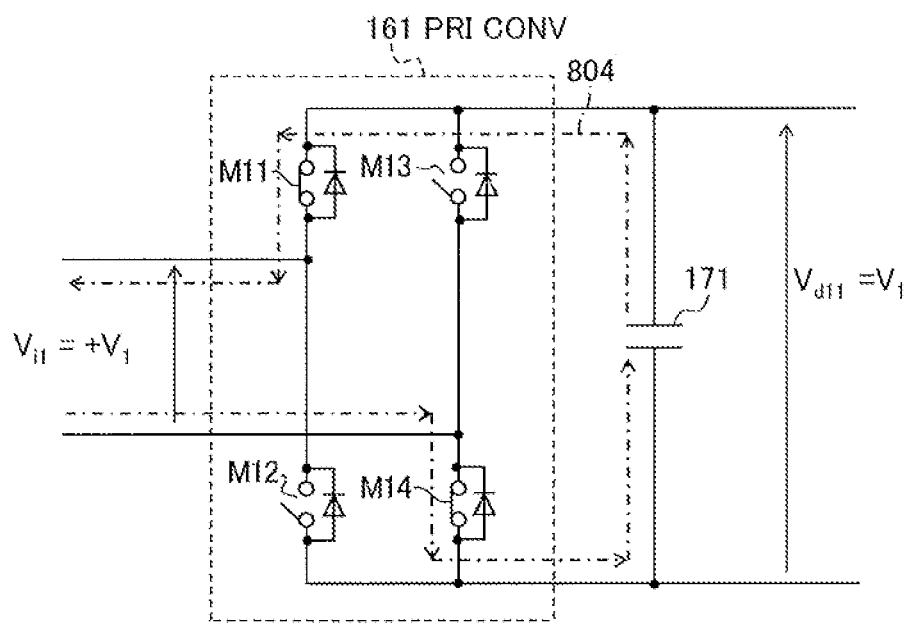
FIG. 17 is a diagram showing an example of how the circuit in a primary converter is operated when the power conversion cell according to the first embodiment of the present invention has a negative input current and a capacitor thereof is discharged.
Figure 18:
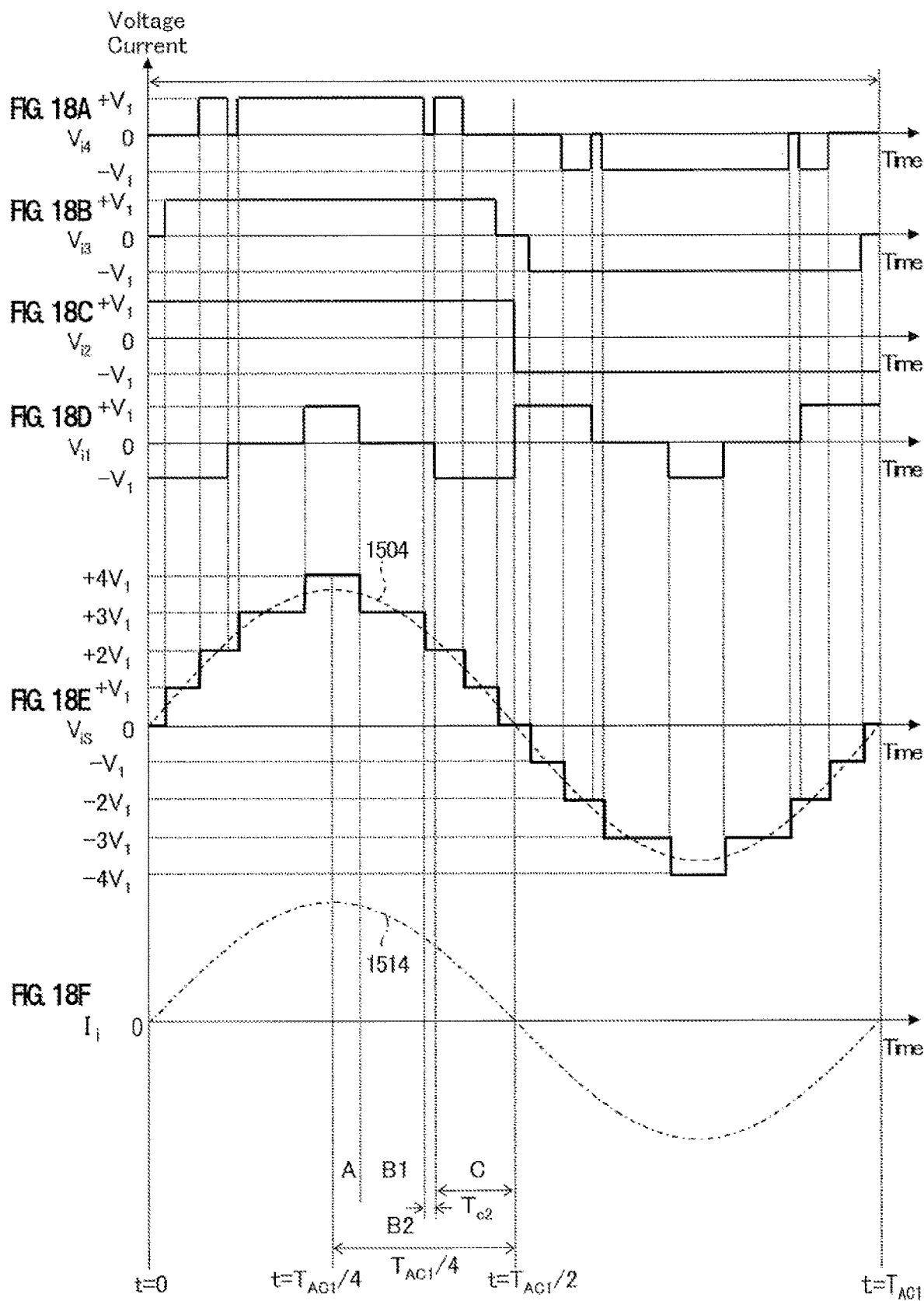
FIGS. 18A to 18F are charts illustrating another example of waveforms of the input voltages of respective power conversion cells when a secondary conversion unit in a power conversion cell according to the first embodiment of the present invention is stopped and another example of the waveform of synthetic input voltage synthesized from these input voltages.
Figure 19:
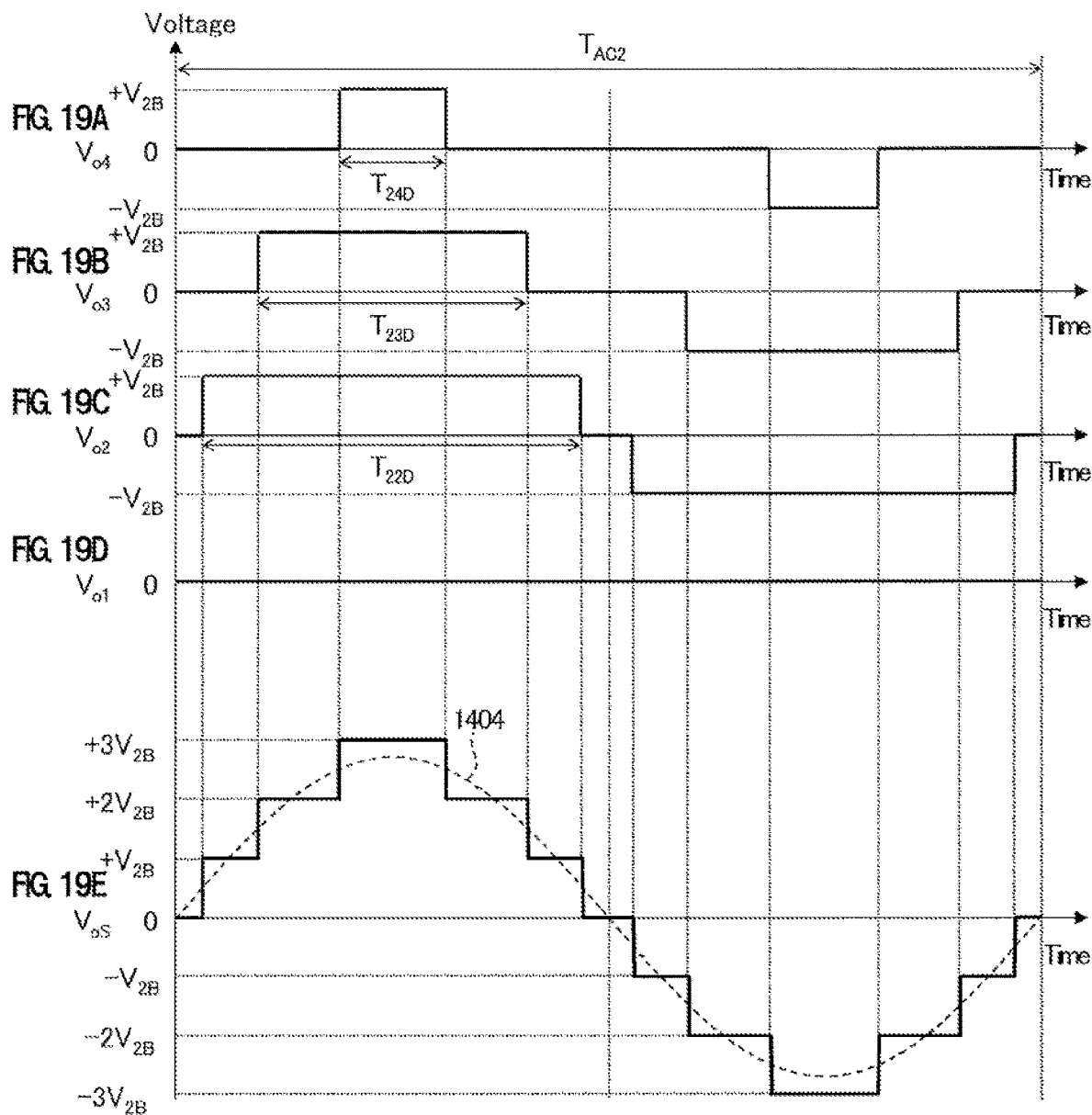
FIGS. 19A to 19E are charts illustrating an example of waveforms of the output voltages of respective power conversion cells when a secondary conversion unit in a power conversion cell according to the first embodiment of the present invention is stopped and an example of the waveform of synthetic output voltage synthesized from these output voltages.

FIG. 17 is a diagram showing an example of how the circuit in the primary converter 161 is operated when the power conversion cell 101 according to the first embodiment of the present invention has a negative input current L and the capacitor 171 is discharged.

As illustrated in FIG. 17, the upper left switching element M11 and the lower right switching element M14 among the four switching elements M11 to 14 are turned on. Then, the input voltage $V_{i1}$ is positive ($+V_{d11}=+V_1$) and a current 804 flows through the capacitor 171 in a discharge direction.

In every cycle (optionally every half cycle or every quarter cycle) of synthetic input voltage $V_{iS}$, the primary converter 161 may be controlled such that the charge and discharge amounts of the capacitor 171 are equal. In this case, the primary DC link voltage $V_{d11}$ is kept at a constant value.

By contrast, in every cycle (optionally every half cycle or every quarter cycle) of synthetic input voltage $V_{iS}$, the discharge amount of the capacitor 171 may be smaller that the charge amount. In this case, even if the capacitor 171 has a sufficiently large electrostatic capacity, the primary DC link voltage $V_{d11}$ increases gradually.

The above period B2 is provided so as to make the charge amount of the capacitor 171 equal to the discharge amount in every cycle (optionally every half cycle or every quarter cycle) of synthetic input voltage $V_{iS}$. Note that if the charge amount of the capacitor 171 can be made equal to the discharge amount, the capacitor 171 may be charged, like in period A, in part or the entire period B2.

<<Control when Charge and Discharge Amounts of Capacitor Cannot be Controlled to be Perfectly Equal>>

The above describes the case where the charge and discharge amounts of the capacitor 171 can be controlled to be perfectly equal.

However, due to some reason such as control algorithm error, a case may be considered where the charge and discharge amounts of the capacitor 171 cannot be controlled to be perfectly equal.

When the charge and discharge amounts cannot be controlled to be perfectly equal, feedback control is used to control the primary DC link voltage $V_{d11}$ to a target value $V_1$.

In FIGS. 13A to 13F, period C, namely, a period during which the capacitor 171 is discharged is defined as $T_{c1}$. This $T_{c1}$ may be used as a manipulated variable for the feedback control. When the primary DC link voltage $V_{d11}$ is higher than the target value $V_1$ for some reason, $T_{c1}$ is made larger. That is, period C is extended and period B2 may be shortened instead.

When $T_{c1}$ is defined as shown in FIGS. 13A to 13F, the feedback control calculation for determining $T_{c1}$ may be carried out every quarter cycle of synthetic input voltage $V_{iS}$.

<<Another Example of Input Voltage Waveforms of Respective Power Conversion Cells and Synthetic Input Voltage Waveform when Secondary Conversion Unit is Stopped>

FIGS. 18A to 18F are charts illustrating another (additional) example of waveforms of the input voltages $V_{i1}$ to $V_{i4}$ of the respective power conversion cells 101 to 104 when the secondary conversion unit 121 in the power conversion cell 101 according to the first embodiment of the present invention is stopped and another (additional) example of the waveform of synthetic input voltage $V_{iS}$ synthesized from these input voltages.

In FIGS. 18A to 18F compared to FIGS. 13A to 13F, period C and period B2 are switched in the order.

As described above, the controller 300 operates the primary converter 161 in view of both controlling the primary DC link voltage $V_{d11}$ of the power conversion cell 101 to a prescribed voltage and controlling the synthetic input voltage $V_{iS}$ to a target level.

This control causes the primary DC link voltage $V_{d11}$ to be kept at a prescribed voltage as well as the primary DC link voltage $V_{d11}$ can be used to continuously generate the input voltage $V_{i1}$ and the synthetic input voltage $V_{iS}$.

<<Output Voltage Waveforms of Respective Power Conversion Cells and Synthetic Output Voltage Waveform when Secondary Conversion Unit is Stopped>>

FIGS. 19A to 19E are charts illustrating an example of waveforms of the output voltage $V_{o1}$ to $V_{o4}$ of the power conversion cells 101 to 104 when the secondary conversion unit 121 in the power conversion cell 101 according to the first embodiment of the present invention is stopped and an example of the waveform of synthetic output voltage $V_{oS}$ synthesized from these output voltages.

In FIGS. 19A to 19D, the ordinate represents the output voltages $V_{o1}$ to $V_{o4}$, the synthetic output voltage $V_{oS}$, and the target values $V_{2B}$ of the secondary DC link voltages; and the abscissa is a time point or time (time course).

In addition, FIG. 19E shows a waveform during one cycle of AC cycle $T_{AC2}$ output from the power conversion device 10.

In addition, the dashed sine wave 1404, on which the synthetic output voltage $V_{oS}$ waveform is superimposed, of FIG. 19E is a basic wave component included in the synthetic output voltage $V_{oS}$. This basic wave component may be considered to be a target value for the synthetic output voltage $V_{oS}$.

In FIGS. 19A to 19E, the secondary bypass device 151 of the power conversion cell 101 is turned on. Accordingly, the output voltage $V_{o1}$ of the power conversion cell 101 is 0 as shown in FIG. 19D.

In addition, the power conversion cells 102 to 104 generate negative or positive pulsed output voltages $V_{o2}$ to $V_{o4}$ like in a normal state.

Even when the output voltage $V_{o1}$ of the power conversion cell 101 is 0, it is desirable that the synthetic output voltage $V_{oS}$ has substantially the same output amplitude and frequency as in a normal state. To achieve this, regarding the output voltages $V_{o1}$ to $V_{o4}$ of the power conversion cells 102 to 104 as shown in FIGS. 19A to 19D, the amplitudes and pulse widths of the pulse waveforms are changed when compared to those in a normal state.

In FIGS. 19A to 19C, the amplitudes of the output voltages $V_{o2}$ to $V_{o4}$ are changed from $V_2$ to $V_{2B}$, for instance. In this case, the controller 300 changes, from $V_2$ to $V_{2B}$, the target values of the secondary DC link voltage $V_{d22}$ to $V_{d24}$ controlled by the primary conversion units 112 to 114 of the power conversion cells 102 to 104.

The output voltages $V_{o1}$ to $V_{o4}$ of the respective power conversion cells 101 to 104 are synthesized to generate a multi-level pseudo sine wave-shaped synthetic output voltage $V_{oS}$. Note that as described above, the output voltage $V_{o1}$ of the power conversion cell 101 is 0 over the entire period. In addition, the amplitudes of the output voltages $V_{o1}$ to $V_{o4}$ of the power conversion cells 102 to 104 are changed from $V_2$ to $V_{2B}$ as well as a period during which $V_{2B}$ is output is extended to $T_{22B}$ to $T_{24B}$, respectively.

Note that the number of levels of the synthetic output voltage $V_{oS}$ including positive and negative levels are decreased from 9, which is the number in a normal state, to 7.

However, as described above, the target values $V_{2B}$ of the secondary DC link voltages may be set to be larger than $V_2$ in a normal state. In this case, even if the number of levels of the synthetic output voltage $V_{oS}$ is smaller than in a normal state, the amplitude of the synthetic output voltage $V_{oS}$ can be maintained. For instance, the level is set as $V_{2B}=(4/3)\cdot V_2$.

If the load 600 is a motor, the operation can be continued without impairing the rotational speed range compared to that in a normal state.

In addition, the amplitudes of the output voltages $V_{o1}$ to $V_{o4}$ are not changed from $V_2$ to $V_{2B}$ in some cases. Specifically, the target values $V_{2B}$ of the secondary DC link voltages may be equal to $V_2$ in a normal state, that is, the target values of the secondary DC link voltages are not changed from the level in a normal state. In this case, the amplitude of the synthetic output voltage $V_{oS}$ is lower than that in a normal state.

However, even if the amplitude of the synthetic output voltage $V_{oS}$ decreases, the load 600 may be continuously operated. In this case, the target values of the secondary DC link voltage $V_{d22}$ to $V_{d24}$ are not necessarily changed. For instance, a case may be considered where the load 600 is a motor and a decrease in the upper limit of rotational speed can be permitted.

<<Case where Both Primary Conversion Unit and Secondary Conversion Unit are Stopped>>

Here, when both the primary conversion unit 111 and the secondary conversion unit 121 of one power conversion cell 101 are stopped due to, for instance, malfunction and/or maintenance, both the primary bypass device 141 and the secondary bypass device 151 of the power conversion cell 101 to be stopped are turned on. Meanwhile, the other power conversion cells 102 to 104 are operated in the manner described using FIGS. 12 and 19.

That is, even when both the primary conversion unit 111 and the secondary conversion unit 121 of one power conversion cell 101 are stopped, the other power conversion cells 102 to 104 may be operated in a given manner to continuously operate the power conversion device 10.

<Summary of how Power Conversion Device of First Embodiment Works>

As described above, even when the secondary conversion unit 121 of one power conversion cell 101 is to be stopped due to, for instance, malfunction and/or maintenance, the power conversion device 10 can be smoothly and continuously operated by using sound elements including the primary conversion unit 111 of the power conversion cell 101.

When the secondary conversion unit of another power conversion cell is to be stopped, control is executed in the same fashion, so that the operation can be smoothly continued by using sound elements including the primary conversion unit of the cell, the secondary conversion unit of which is to be stopped.

In addition, by operating the primary conversion unit of the power conversion cell having the secondary conversion unit stopped, the amplitude of the synthetic input voltage $V_{iS}$ can be kept, without increasing the primary DC link voltage, at the same magnitude as in a normal state. Accordingly, the power conversion device 10 can receive power from the power source 500 in substantially the same manner as in a normal state and can thus continue the operation. In addition, the number of levels of the synthetic input voltage $V_{iS}$ and the voltage per level are the same as in a normal state. Hence, neither harmonic components of the input current nor electromagnetic noise generated in the primary conversion unit increases.

Advantageous Effects of First Embodiment

The above-described configuration of the first embodiment is used to provide a power conversion device including multiple power conversion cells, each power conversion cell including a transformer, a primary conversion unit, and a secondary conversion unit, wherein when any one of the primary conversion unit or the secondary conversion unit in a part of power conversion cells is to be stopped due to, for instance, malfunction and/or maintenance, the power conversion device keeps output power quality, by using sound elements including the primary conversion unit or the secondary conversion unit, whichever is not stopped, in the power conversion cell, can be smoothly and continuously operated, and is thus highly reliable. The above can be realized without providing a backup power conversion cell(s) (cell(s)).

Second Embodiment

The following describes, as a second embodiment, a three-phase power conversion device 20 using three power conversion devices 10 according to the first embodiment.

Figure 20:
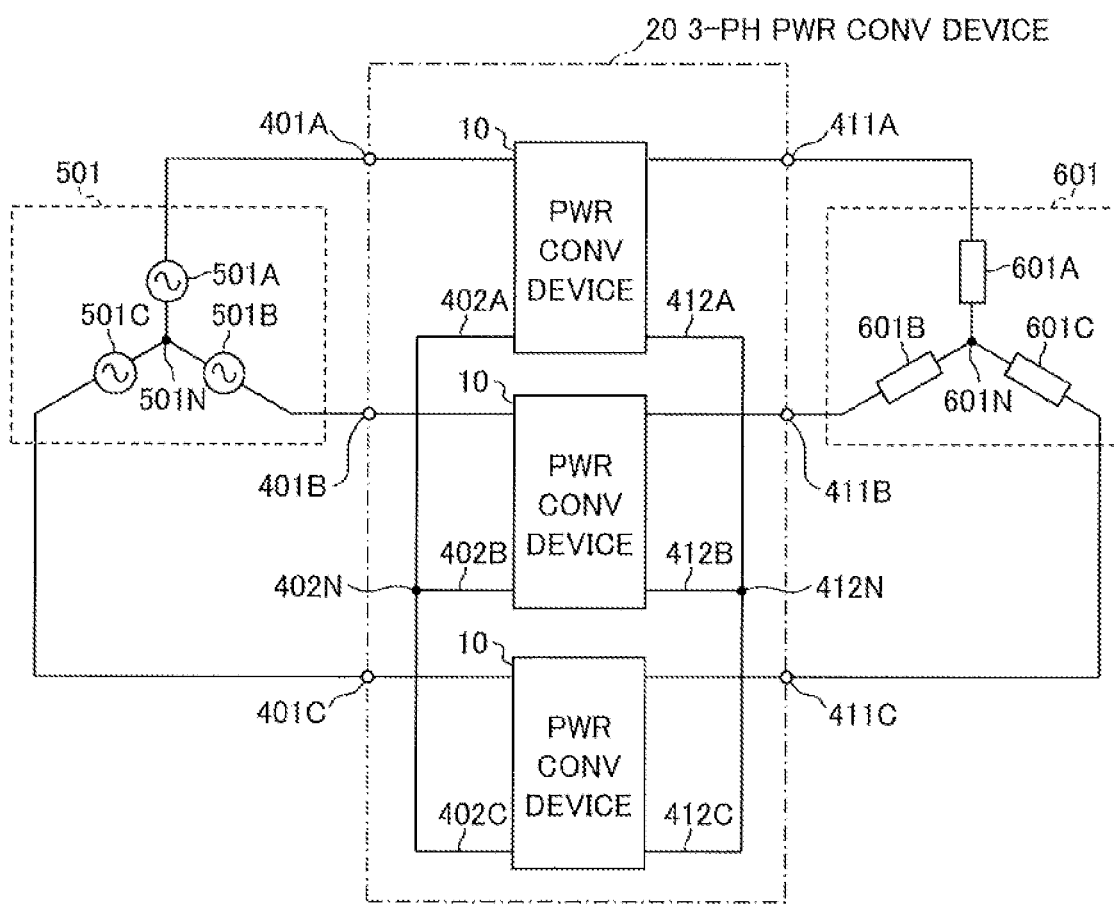
FIG. 20 is a block diagram illustrating a circuit configuration example of a three-phase power conversion device according to a second embodiment of the present invention.

FIG. 20 is a block diagram illustrating a circuit configuration example of the three-phase power conversion device 20 according to the second embodiment of the present invention.

In FIG. 20, the three-phase power conversion device 20 includes three power conversion devices 10 described in the first embodiment. Here, the three-phase power conversion device 20 converts three-phase AC power input from an external three-phase AC power source 501 to output three-phase AC power to an external three-phase load 601. Examples of the three-phase load 601 include three-phase motors such as induction motors and may include other kinds of electric devices.

As shown in FIG. 20, one of two input terminals for each of the three power conversion devices 10 is formed of a three-phase input terminal 401A, 401B, or 401C, which is connected to the three-phase AC power source 501. Note that in the three-phase AC power source 501, three single-phase AC power sources 500A, 500B, and 500C are subjected to a Y-connection.

In addition, the other of two input terminals for each of the three power conversion devices 10 is an input terminal 402A, 402B, or 402C. These terminals are connected to one another to form a neutral point 402N in the three-phase AC circuit of a Y-connection.

In addition, one of two output terminals for each of the three power conversion devices 10 is formed of a three-phase output terminal 411A, 411B, or 411C, which is connected to the three-phase motor 601, namely, a load. Note that the three-phase motor 601 includes three coils 601A, 601B, and 601C, which are subjected to a Y-connection (with a neutral point 601N).

Further, the other of two output terminals for each of the three power conversion devices 10 is an output terminal 412A, 412B, or 412C. These terminals are connected to one another to form a neutral point 412N in the three-phase AC circuit of a Y-connection.

In the above configuration, the functions and operations described in the first embodiment cause each power conversion device 10 included in the three-phase power conversion device 20 to generate a single-phase AC synthetic input voltage by using a neutral point as a reference.

In addition, synthetic input voltages generated in the three power conversion devices 10 can be used to cause the three-phase power conversion device 20 to generate a three-phase AC voltage by using the neutral point 412N as a reference.

Further, the three power conversion devices 10 in the three-phase power conversion device 20 are each connected via the reactor 400 (FIG. 1) to the three-phase AC power source 501.

The controller 300 (FIG. 1) included in each of the three power conversion devices 10 can control power input from the three-phase AC power source 501 by controlling the amplitudes and phases of three-phase AC voltages generated by using synthetic input voltages of the three power conversion devices 10.

Furthermore, the controllers 300 control the amplitude and phase of three-phase AC voltage generated by using synthetic output voltages of the three power conversion devices 10 and causes the three-phase AC voltage to be output to the three-phase load 601.

Advantageous Effects of Second Embodiment

The above makes it possible for the three-phase power conversion device 20 for inputting and outputting a three-phase alternating current to obtain substantially the same effects as on the single-phase alternating current described in the first embodiment. Specifically, even when the primary conversion unit of at least one power conversion cell is to be stopped due to, for instance, malfunction and/or maintenance, the three-phase power conversion device 20 can be smoothly and continuously operated, while keeping output power quality, by using sound elements including a secondary conversion unit of the power conversion cell, the primary conversion unit of which is to be stopped. In addition, when the secondary conversion unit of at least one power conversion cell is to be stopped, sound elements including the primary conversion unit of the power conversion cell, the secondary conversion unit of which is to be stopped, can be used to smoothly continue the operation while keeping output power quality. The above can be realized without providing a backup power conversion cell(s) (cell(s)).

Third Embodiment

The following describes, as a third embodiment, a power conversion device using a DC voltage (power) as a power source.

Figure 21:
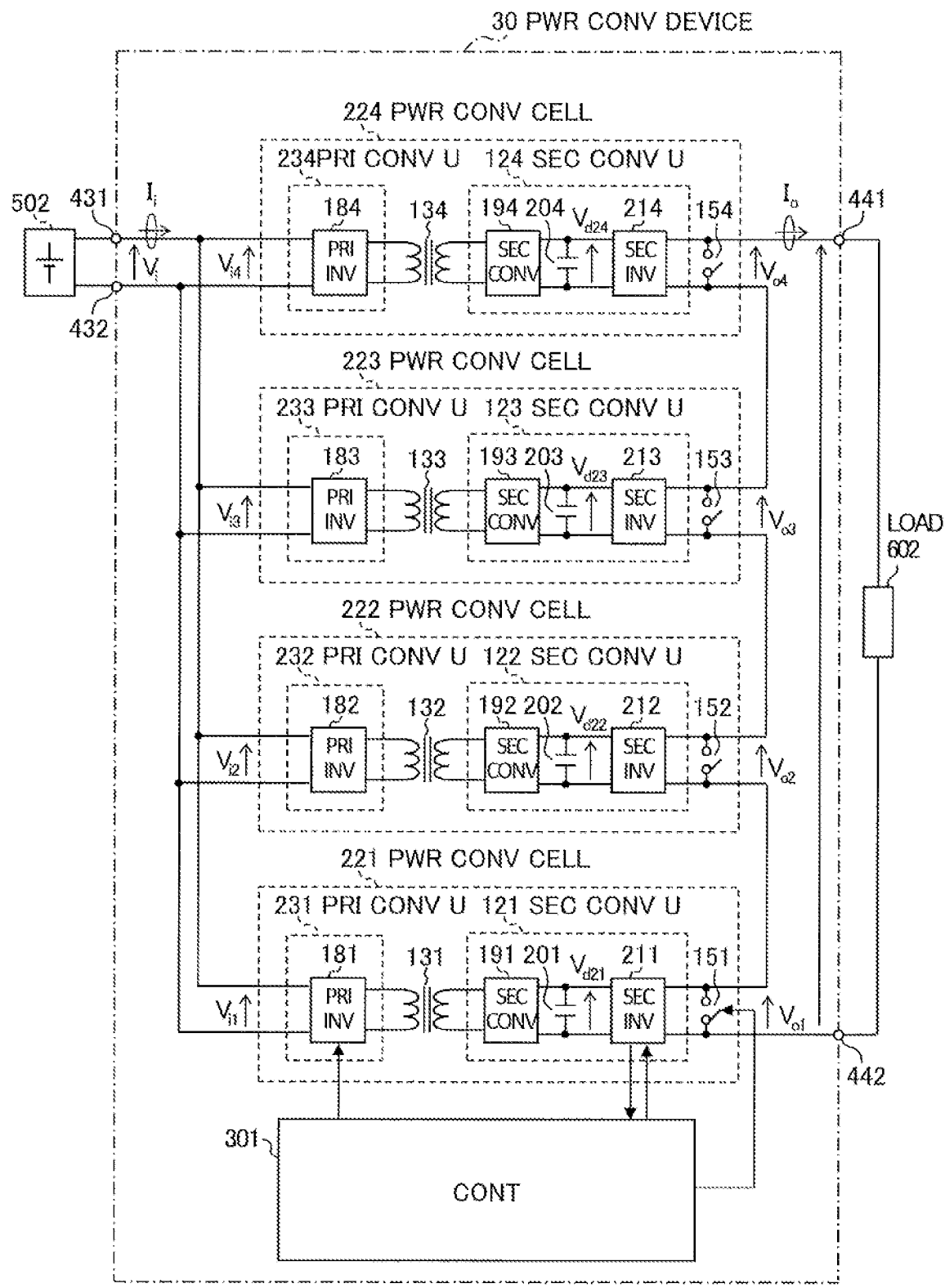
FIG. 21 is a block diagram illustrating a circuit configuration example of a power conversion device according to a third embodiment of the present invention.

FIG. 21 is a block diagram illustrating a circuit configuration example of a power conversion device 30 according to the third embodiment of the present invention. In FIG. 21, the power conversion device 30 converts electric power input from an external DC power source 502 into AC power with a variable frequency and a variable voltage. This output power is supplied to a load 602.

In addition, in FIG. 21, the power conversion device 30 includes a plurality of power conversion cells 221 to 224 and a controller 301. Further, in the power conversion device 30, respective input terminals 431 and 432 of the power conversion cells 221 to 224 are connected in parallel. Furthermore, respective output terminals of the power conversion cells 221 to 224 are connected in series. Then, the power conversion device 30 supplies an AC output voltage (power) through the output terminals 441 and 442 to the load 602.

The difference in the configuration between the third embodiment and the first embodiment involves using the DC power source 502 as an external power source to supply this DC voltage (power) to the plurality of power conversion cells 221 to 224 in parallel.

Because of this, primary conversion units 231 to 234 of the power conversion cells 221 to 224 in the third embodiment differ from the primary conversion units 111 to 114 in the first embodiment.

In addition, in the third embodiment, the voltage (power) of the external DC power source 502 is supplied to the power conversion cells 221 to 224 in parallel. Accordingly, the primary bypass devices 141 to 144 in the first embodiment are unnecessary.

Further, in the third embodiment, the DC voltage of the external DC power source 502 is used. Accordingly, the reactor 400 in the first embodiment is unnecessary.

Note that the above connection method makes it possible to output a high voltage from the power conversion device 30 to the load 602, even when the DC power source 502 supplies a relatively low voltage while a step-up transformer outside the power conversion device 30 is not provided.

The following is focused on and describes the points different between the power conversion device 30 of the third embodiment and the power conversion device 10 of the first embodiment. Here, redundant descriptions are omitted, if appropriate.

In FIG. 21, the power conversion cells 221 to 224 include the primary conversion units 231 to 234, the secondary conversion units 121 to 124, the transformers 131 to 134, and the secondary bypass devices 151 to 154, respectively.

As described above, the secondary conversion units 121 to 124, the transformers 131 to 134, and the secondary bypass devices 151 to 154 have the same configurations as of the first embodiment and redundant descriptions are omitted, if appropriate.

The following mainly describes the primary conversion units 231 to 234.

The primary conversion units 231 to 234 include the primary inverters 181 to 184 like in the primary conversion units 111 to 114 in the first embodiment.

In the primary conversion units 231 to 234, which differ from the primary conversion units 111 to 114 in the first embodiment, there are no primary DC link voltages $V_{d11}$ to $V_{d14}$.

As specific circuit schemes of the primary inverters 181 to 184, each circuit of the primary inverter 181 in the circuit configuration of FIG. 2 is applicable.

The primary inverters 181 to 184 convert the input voltages $V_{i1}$ to $V_{i4}$ of the respective power conversion cells 221 to 224 into AC voltages, which are applied to primary windings of the transformers 131 to 134, respectively.

The transformers 131 to 134 and the secondary conversion units 121 to 124, as described above, are operated in the fashion described in the first embodiment.

Output terminals of the secondary conversion units 121 to 124, namely, output terminals of the power conversion cells 221 to 224 are connected in series. Accordingly, the voltage synthesized using the output voltages $V_{o1}$ to $V_{o4}$ of the power conversion cells 221 to 224, respectively, is output through the output terminals 411 and 412 to the load 602.

The voltage synthesized using the output voltages $V_{o1}$ to $V_{o4}$ of the power conversion cells 221 to 224, respectively, is defined, like in the first embodiment, as a synthetic output voltage $V_{oS}$. The output current $I_o$ of the power conversion device 30 and the output currents $I_o$ of the respective power conversion cells 221 to 224 are all shared.

<How Power Conversion Device in Normal State Works>

How the power conversion device 30 in a normal state works is described.

The controller 301 turns off all the secondary bypass devices 151 to 154 and causes the power conversion cells 221 to 224 to operate in the fashion described using FIGS. 4A to 4E in the first embodiment. The operation details overlap with the descriptions in the first embodiment and are thus omitted.

<How Power Conversion Device Works when Primary Conversion Unit of Power Conversion Cell is Stopped>

The following describes how the power conversion device 30 works when the primary conversion unit 231 of one power conversion cell 221 is to be stopped due to, for instance, malfunction and/or maintenance.

The controller 301 turns off, like in a normal state, all the secondary bypass devices and causes the power conversion cells 221 to 224 to operate in the fashion described by referring to FIGS. 6A to 11F in the first embodiment. The operation details are redundant and are thus omitted.

Note that the primary inverters 182 to 184 of the power conversion cells 222 to 224 and the secondary conversion units 121 to 124 of the power conversion cells 221 to 224 are made to operate as described above. This makes it possible to stop the primary conversion unit 231 of the power conversion cell 221 without affecting the function and operation of the power conversion device 30.

In view of the above, even when the primary conversion unit 231 of the one power conversion cell 221 is to be stopped due to, for instance, malfunction and/or maintenance, the power conversion device 30 can be continuously operated by using sound elements including the secondary conversion unit 121 of the power conversion cell 221.

When the primary conversion unit in another of the power conversion cells 222 to 224 is to be stopped, control is executed in the same fashion, so that the operation can be continued by using sound elements including the secondary conversion unit of the power conversion cell, the primary conversion unit of which is to be stopped.

<How Power Conversion Device Works when Secondary Conversion Unit of Power Conversion Cell is Stopped>

The following describes how the power conversion device 30 works when the secondary conversion unit 121 of one power conversion cell 221 is to be stopped due to, for instance, malfunction and/or maintenance.

The controller 301 turns on the secondary bypass device 151 in the power conversion cell 221, the secondary conversion unit of which is to be stopped, and causes the respective power conversion cells to operate in the fashion described using FIGS. 19A to 19E in the first embodiment. The operation details are redundant and are thus omitted.

In view of the above, even when the secondary conversion unit 121 of the one power conversion cell 221 is to be stopped due to, for instance, malfunction and/or maintenance, the power conversion device 30 can be smoothly and continuously operated, while keeping output power quality, by using sound elements including the primary conversion unit 231 of the power conversion cell 221.

When the secondary conversion unit of another power conversion cell is to be stopped, control is executed in the same fashion, so that the operation can be smoothly continued, while keeping output power quality, by using sound elements including the primary conversion unit of the power conversion cell, the secondary conversion unit of which is to be stopped.

Note that even when both the primary conversion unit 231 and the secondary conversion unit 121 of the one power conversion cell 221 are stopped due to, for instance, malfunction and/or maintenance, the power conversion device 30 can be continuously operated by executing the control in the same fashion.

Advantageous Effects of Third Embodiment

The above-described configuration of the third embodiment is used to provide a power conversion device wherein when any one of the primary conversion unit or the secondary conversion unit in at least one power conversion cell is to be stopped due to, for instance, malfunction and/or maintenance, the power conversion device keeps output power quality, by using sound elements including the primary conversion unit or the secondary conversion unit, whichever is not stopped, in the power conversion cell, can be smoothly and continuously operated, and is thus highly reliable. The above can be realized without providing a backup power conversion cell(s) (cell(s)).

Fourth Embodiment

The following describes, as a fourth embodiment, a three-phase power conversion device 40 using three power conversion devices 30 according to the third embodiment.

Figure 22:
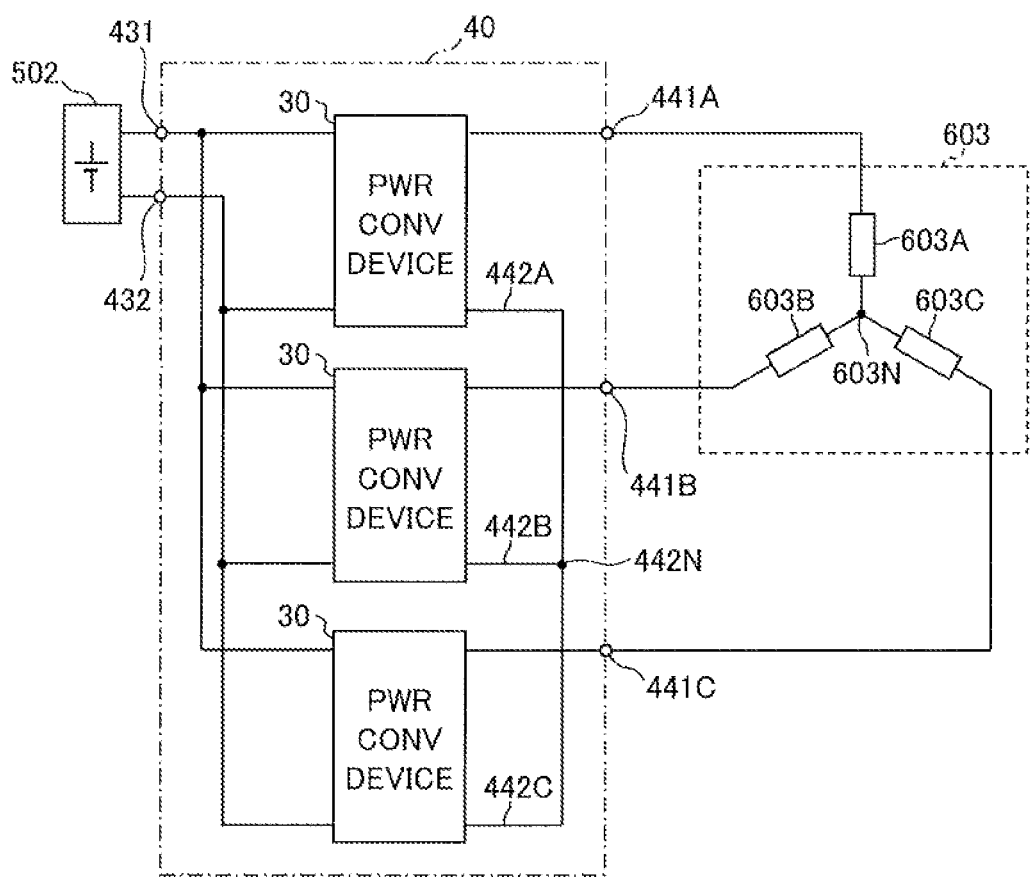
FIG. 22 is a block diagram illustrating a circuit configuration example of a three-phase power conversion device according to a fourth embodiment of the present invention.

FIG. 22 is a block diagram illustrating a circuit configuration example of the three-phase power conversion device 40 according to the fourth embodiment of the present invention.

In FIG. 22, the three-phase power conversion device 40 includes three power conversion devices 30 described in the third embodiment. Here, the three-phase power conversion device 40 converts a DC voltage (power) input from an external DC power source 502 to output three-phase AC power to an external three-phase load 603. Examples of the three-phase load 603 include three-phase motors such as induction motors and may include other kinds of electric devices.

As shown in FIG. 22, respective input terminals of the three power conversion devices 30 are connected to one another in parallel and are input terminals 431 and 432 of the three-phase power conversion device 40. Then, the input terminals 431 and 432 of the three-phase power conversion device 40 are connected to the DC power source 502 and a DC voltage (power) is input accordingly.

In addition, one of two output terminals for each of the three power conversion devices 30 is formed of a three-phase output terminal 441A, 441B, or 441C, which is connected to the three-phase motor 603, namely, a load. Note that the three-phase motor 603 includes three coils 603A, 603B, and 603C, which are subjected to a Y-connection (with a neutral point 603N).

Further, the other of two output terminals for each of the three power conversion devices 30 is an output terminal 442A, 442B, or 442C. These terminals are connected to one another to form a neutral point 442N in the three-phase AC circuit of a Y-connection.

The above configures the three-phase power conversion device 40 that outputs a three-phase alternating current.

Advantageous Effects of Fourth Embodiment

The above configuration is used to obtain, in the three-phase power conversion device 40 that outputs a three-phase alternating current, substantially the same effects as of the power conversion device 30 that outputs a single-phase alternating current.

Specifically, even when the primary conversion unit of at least one power conversion cell is to be stopped due to, for instance, malfunction and/or maintenance, the three-phase power conversion device 40 can be smoothly and continuously operated, while keeping output power quality, by using sound elements including the secondary conversion unit of the power conversion cell, the primary conversion unit of which is to be stopped, so that a highly-reliable power conversion device is provided.

In addition, when the secondary conversion unit of at least one power conversion cell is to be stopped, sound elements including the primary conversion unit of the power conversion cell, the secondary conversion unit of which is to be stopped, can be used to provide a highly reliable power conversion device that can smoothly continue the operation while keeping output power quality. The above can be realized without providing a backup power conversion cell(s) (cell(s)).

Other Embodiments

Note that the present invention is not limited to the above-described embodiments and further encompasses various modification embodiments. For instance, the above embodiments are detailed for making the present invention understandable in the description. Thus, the present invention is not necessarily limited to embodiments including all the elements described. In addition, part of the configuration of a certain embodiment may be replaced by part of the configuration of another embodiment. Further, part or the entire configuration of a certain embodiment can be added to, deleted from, and/or replaced in the configuration of another embodiment.

Hereinafter, other embodiments or modification embodiments are further described.

<<Other Configurations of Power Conversion Device>>

FIGS. 1 and 21 illustrate examples using four power conversion cells. However, the number of cells is optionally selected. As the number of cells increases, the output voltage becomes closer to a sine wave and the quality improves.

Besides, the power conversion device 10 or 30 may include, in addition to the parts described in FIG. 1 or 21, control parts such as breakers or relays, protection parts such as fuses, sensors for detecting a voltage and/or a current, and noise filters.

<<Reactor>>

As described above, in FIG. 1, the power conversion device 10 is provided with the reactor 400 in a connection path to the power source 500. That is, the reactor 400 is inserted in a path through which an input current $I_i$ flows. However, the insertion site is not limited to that in FIG. 1. Plural reactors may be likewise inserted into a path through which an input current $I_i$ flows.

Note that a reactor may be likewise provided in a connection path between the power conversion device 10 and the load 600. However, if the load 600 is a motor, the reactor is dispensable.

<<Switching Element>>

FIGS. 2 and 3 describe MOSFETs as the switching elements. However, the switching elements are not limited to MOSFETs.

It may be possible to use, for instance, other kinds of switching elements such as IGBTs (Insulated Gate Bipolar Transistors), bipolar transistors, and super-junction MOSFETs.

Note that in the case where the switching elements are MOSFETs, the semiconductor structure constituting each MOSFET has a parasitic antiparallel diode. If electrical properties of this parasitic antiparallel diode do not conform to desired properties, an antiparallel diode may be arranged and connected externally.

In addition, when another kind of switching element such as an IGBT or bipolar transistor is used, an antiparallel diode may also be arranged and connected externally.

<<Detector>>

In FIG. 2, the primary conversion unit 111 is provided with the voltage detector F1 for detecting the primary DC link voltage $V_{d11}$. In FIG. 3, the secondary conversion unit 121 is provided with the voltage detector F2 for detecting the secondary DC link voltage $V_{d21}$. However, each detector is not limited to them.

The primary conversion unit 111, the secondary conversion unit 121, or the power conversion cell 101 may be provided with, in addition to the above voltage detectors, a voltage detector(s) for detecting a voltage at another site(s) and/or a detector(s) for detecting a current or a temperature.

<<Circuit Scheme for Primary Converter>>

FIG. 2 shows an H-bridge circuit using four switching elements M11 to M14 as a specific circuit scheme for the primary converter 161. However, if the power conversion can be likewise conducted, another circuit scheme is adoptable.

<<Specific Circuit Scheme for Primary Inverter>>

As a specific circuit scheme for the primary inverter 181, FIG. 2 shows a circuit in which output terminals of an H-bridge circuit using the four switching elements M15 to M18 are connected to the coil 482 and the capacitor 483. However, if the primary DC link voltage $V_{d11}$ can be inverted to apply an AC voltage to the transformer 131, another circuit scheme is adoptable.

<<Secondary Converter>>

FIG. 3 shows a diode bridge circuit (D21 to D24) as a specific circuit scheme for the secondary converter 191. However, if the power conversion can be likewise conducted, another circuit scheme is adoptable.

For instance, it is possible to use an H-bridge circuit using four switching elements like the primary converter 161.

Note that an H-bridge circuit may be used for the primary converter 161 in the configuration of FIG. 3. In this case, the primary inverter 181, the transformer 131, as shown in FIG. 2, and the secondary converter 191 in FIG. 3 are used to constitute a resonance converter, which is a kind of insulated DC-DC converter. The resonance converter itself is a known technology and its detailed description is omitted.

<<Secondary Inverter>>

FIG. 3 shows an H-bridge circuit using the four switching elements M25 to M28 as a specific circuit scheme for the secondary inverter 211. However, if the secondary DC link voltage $V_{d21}$ can be converted to an AC voltage, another circuit scheme is adoptable.

<<Pulse Widths and Rotation of Output Voltages>>

In FIGS. 4A to 4E, the pulse widths of the output voltages $V_{o1}$ to $V_{o4}$ are defined as $T_{21}$ to $T_{24}$. Then, exemplified is $T_{21} > T_{22} > T_{23} > T_{24}$. However, the configuration is not limited to this.

Although not depicted, the pulse widths of the output voltages $V_{o1}$, $V_{o1}$, $V_{o3}$, and $V_{o4}$ may be set to $T_{22}$, $T_{23}$, $T_{24}$, and $T_{21}$, respectively. That is, the four different pulse widths: $T_{21}$ to $T_{24}$ can be arbitrarily allocated to the power conversion cells.

In addition, the pulse width allocation may be subject to rotation in every cycle (optionally half cycle or quarter cycle) of the synthetic output voltage $V_{oS}$. This makes equal the (time average of) output power of each power conversion cell when the time is assumed to be sufficiently longer than the cycle $T_{AC2}$ of the synthetic output voltage $V_{oS}$.

<<Pulse Widths and Rotation of Input Voltages>>

In FIGS. 5A to 5D, the pulse widths of the input voltages $V_{i1}$ to $V_{i4}$ are defined and described as $T_{11}$ to $T_{14}$, respectively. However, the mode is not limited to this.

Although not depicted, the pulse widths of the input voltages $V_{i1}$, $V_{i2}$, $V_{i3}$, and $V_{i4}$ may be set to $T_{12}$, $T_{13}$, $T_{14}$, and $T_{11}$, respectively.

That is, the four different pulse widths: $T_{11}$ to $T_{14}$ can be arbitrarily allocated to the power conversion cells.

In addition, the pulse width allocation may be subject to rotation in every cycle (optionally half cycle or quarter cycle) of the synthetic input voltage $V_{iS}$. This mode makes equal the (time average of) input power of each power conversion cell when the time is assumed to be sufficiently longer than the cycle $T_{AC1}$ of the synthetic input voltage $V_{iS}$.

<<How to Control Charge and Discharge of Capacitor>>

The waveforms of the output voltages $V_{o1}$ to $V_{o4}$ of the respective power conversion cells and the waveform of synthetic output voltage $V_{oS}$ as shown in FIGS. 6A to 6F and how the capacitor 201 is charged and discharged as shown in FIGS. 7 to 10 have been described. However, how to control the charge and discharge of the capacitor 201 is not limited to the above modes.

For instance, the controller 300 may use a sensor (not shown) to detect an output current $I_o$ and determine its polarity. This may determine the polarity of the output voltage $V_{o1}$ when the capacitor 201 is charged.

According to this configuration, the controller 300 can cause the capacitor 201 to be charged depending on the polarity of the output current $I_o$ even if the output power factor of the power conversion device 10 is not 1.

In every cycle (optionally every half cycle or every quarter cycle) of synthetic output voltage $V_{oS}$, the secondary inverter 211 may be controlled such that the charge and discharge amounts of the capacitor 201 are equal. In this case, the secondary DC link voltage $V_{d21}$ is kept at a constant value.

However, in every cycle (optionally every half cycle or every quarter cycle) of synthetic output voltage $V_{oS}$, the discharge amount of the capacitor 201 may be smaller that the charge amount. In this case, even if the capacitor 201 has a sufficiently large electrostatic capacity, the secondary DC link voltage $V_{d21}$ increases gradually.

The above period b2 is provided so as to make the charge amount of the capacitor 201 equal to the discharge amount in every cycle (optionally every half cycle or every quarter cycle) of synthetic output voltage $V_{oS}$.

Note that if the charge amount of the capacitor 201 can be made equal to the discharge amount, the capacitor 201 may be discharged, like in period a, in part or the entire period b2.

Meanwhile, due to some reason such as control algorithm error, a case may be considered where the charge and discharge amounts of the capacitor 201 cannot be controlled to be perfectly equal. In this case, feedback control is used to control the secondary DC link voltage $V_{d21}$ to a target value $V_2$.

In FIGS. 6A to 6F, period c, namely, a period during which the capacitor 201 is charged is defined as $T_{c2}$. This $T_{c2}$ may be used as a manipulated variable for the feedback control.

When the secondary DC link voltage $V_{d21}$ is higher than the target value $V_2$ for some reason, $T_{c2}$ may be made smaller, that is, period c may be shortened and period b2 may be extended instead.

When $T_{c2}$ is defined as shown in FIGS. 6A to 6F, the feedback control calculation for determining $T_{c2}$ may be carried out every quarter cycle of synthetic output voltage $V_{oS}$.

<<How to Divide Charge and Discharge Periods>>

In FIGS. 11A to 11F compared to FIGS. 6A to 6F, period c and period b2 are switched in the order. In this regard, however, how to set a charge period is not limited to this example.

Note that although not depicted, period c, during which the capacitor 201 is charged, may be divided into two or more sections in a quarter cycle of the waveform of synthetic output voltage $V_{oS}$.

In addition, in FIGS. 18A to 18F compared to FIGS. 13A to 13F, period C and period B2 are switched in the order. In this regard, however, how to set a discharge period is not limited to this example.

Although not depicted, for instance, period C, during which the capacitor 171 is discharged, may be divided into two or more sections in a quarter cycle of the synthetic input voltage $V_{iS}$.

<<Polarity of Input Voltage when Capacitor is Discharged>>

In a period from time point $T_{AC1}/2$ to time point $T_{AC1}$ in the first embodiment of FIGS. 13A to 13F, the input current $I_i$ is negative. When the input current $I_i$ is negative, it is described that the primary converter 161 is controlled such that the input voltage $V_{i1}$ is positive ($+V_{d11}=+V_1$) and the capacitor 171 is discharged. In this mode, the input power factor of the power conversion device 10 is assumed to be 1 and the controller 300 controls the four switching elements M11 to M14 as shown in FIG. 17.

However, the input power factor of the power conversion device 10 is not limited to 1. A way to counteract such a case involves a method for detecting an input current $I_i$ by a sensor (not shown) and using the input current. Specifically, the controller 300 uses a sensor to detect an input current $I_i$ and determine the polarity. In this way, the method determines the polarity of the input voltage $V_{i1}$ when the capacitor 171 is discharged. According to this configuration, the controller 300 can cause the capacitor 171 to be discharged depending on the polarity of the input current $I_i$ even if the input power factor of the power conversion device 10 is not 1.

<<Multiple Use of Controller>>

In FIG. 20, the three-phase power conversion device 20 includes three power conversion devices 10. Each power conversion device 10 includes one controller 300 (FIG. 1).

Thus, the three-phase power conversion device 20 includes three controllers 300. In the three-phase power conversion device 20, however, these three controllers 300 may be integrated into one controlling unit.

<<Neutral Line Connection>>

FIG. 20 shows the second embodiment and the three-phase power conversion device 20 as describe above. Here, the other of two input terminals for each of the three power conversion devices 10 is the input terminal 402A, 402B, or 402C. These terminals are connected to one another to form the neutral point 402N of the Y-connection.

In addition, the other of two input terminals for each of the three power conversion devices 10 is the output terminal 412A, 412B, or 412C. These terminals are connected to one another to form the neutral point 412N of the Y-connection.

Further, the three AC power sources 500A, 500B, and 500C included in the three-phase AC power source 501 are structured using the Y-connection with the neutral point 500N.

Furthermore, the three-phase motor 601 includes the three coils 600A, 600B, and 600C, which are subjected to the Y-connection with the neutral point 600N.

These neutral points 402N, 412N, 500N, and 600N may each be separated as shown in FIG. 20, but the way is not limited to this.

For instance, either one or all of the neutral points 402N, 412N, 500N, or 600N may be connected directly or via a given resistor to the ground (earth).

<<Three-Phase Load>>

The three-phase load (three-phase motor) 601 shown in FIG. 20 and the three-phase load (three-phase motor) 603 shown in FIG. 22 are structured using a Y connection, for instance. However, the structures of the three-phase loads (three-phase motors) 601 and 603 are not limited to the Y-connection.

When the three-phase load (three-phase motor) 601 or 603 is structured using a Δ-connection, it is effective to use the three-phase power conversion device 20 according to the second embodiment and the three-phase power conversion device 40 according to the fourth embodiment of the present invention.

Applications of Third Embodiment

A motor is exemplified as the load 602 in the power conversion device 30 according to the third embodiment as shown in FIG. 21. However, examples are not limited to this motor.

For instance, the power conversion device 30 is applicable to, for instance, PCS (Power Conditioning System: a power conditioner) for photovoltaic power generation. The PCS can convert a DC current generated by solar panels to an AC current (AC power) generally used in home appliances.

REFERENCE SIGNS LIST 10, 30 Power conversion device
20, 40 Three-phase power conversion device
101 to 104, 221 to 224 Power conversion cell
111 to 114, 231 to 234 Primary conversion unit
121 to 124 Secondary conversion unit
131 to 134 Transformer
141 to 144 Primary bypass devices
151 to 154 Secondary bypass devices
161 to 164 Primary converter
171 to 174, 201 to 204, 483 Capacitor
181 to 184 Primary inverter
191 to 194 Secondary converter
211 to 214 Secondary inverter
300, 301 Controller
400, 482 Reactor, Coil
500, 501A, 501B, 501C AC power source, Power source
501 Three-phase AC power source
402N, 412N, 442N, 501N, 601N, 603N Neutral point
502 DC power source, Power source
600, 601A, 601B, 601C, 602, 603A, 603B, 603C Load, Motor
601, 603 Three-phase load, Three-phase motor
D21 to D24 Diode
F1, F2 Voltage detector
M11 to M18, M25 to M28 Switching element, MOSFET

The invention claimed is:

1. A power conversion device comprising:
a plurality of power conversion cells; and
a controller configured to control the plurality of power conversion cells,
each power conversion cell comprising:
a transformer;
a primary conversion unit disposed on a primary side of the transformer;
a secondary conversion unit disposed on a secondary side of the transformer;
a primary bypass device for causing a circuit to short between input terminals of the power conversion cell; and
a secondary bypass device for causing a circuit to short between output terminals of the power conversion cell,
wherein
at least one of the input terminals and the output terminals of the plurality of power conversion cells are connected in series, respectively;
when the primary conversion unit of a part of the plurality of power conversion cells is to be stopped, the controller turns on the primary bypass device and controls the secondary conversion units to set secondary DC link voltages generated in the secondary conversion units to prescribed values; and
when the secondary conversion unit of a part of the plurality of power conversion cells is to be stopped, the controller turns on the secondary bypass device and controls the primary conversions units to set primary DC link voltages generated in the primary conversion units to prescribed values.

2. The power conversion device according to claim 1, wherein when the primary conversion unit of the part of the plurality of power conversion cells is to be stopped, the controller controls the primary conversion units in the other power conversion cells such that the primary DC link voltages are made larger than in a normal state; and when the secondary conversion unit of a part of the plurality of power conversion cells is to be stopped, the controller controls the secondary conversion units in the other power conversion cells such that the secondary DC link voltages are made larger than in a normal state.

3. The power conversion device according to claim 1, wherein
both the input terminals and the output terminals of the plurality of power conversion cells are connected in series.

4. The power conversion device according to claim 3, further comprising a reactor,
wherein AC power is input from an external power source via the reactor into the power conversion device and the input AC power is converted to AC power with a variable frequency and a variable voltage to output the converted AC power to an external load;
wherein the primary conversion unit comprises
  a primary converter configured to convert a voltage input into the primary conversion unit to the primary DC link voltage,
  a capacitor configured to smooth the primary DC link voltage, and
  a primary inverter configured to convert the primary DC link voltage to an AC voltage and apply the AC voltage to primary winding of the transformer; and
wherein the secondary conversion unit comprises
  a secondary converter configured to convert a voltage induced in secondary winding of the transformer to the secondary DC link voltage,
  a capacitor configured to smooth the secondary DC link voltage, and
  a secondary inverter configured to convert the secondary DC link voltage to an AC voltage.

5. The power conversion device according to claim 4, wherein
when the primary conversion unit of the part of the plurality of power conversion cells is to be stopped, the controller controls the secondary inverters to set the secondary DC link voltages to prescribed levels by charging and discharging the capacitors configured to smooth the secondary DC link voltage in the power conversion cell; and
when the secondary conversion unit of the part of the plurality of power conversion cells is to be stopped, the controller controls the primary converters to set the primary DC link voltages to prescribed levels by charging and discharging the capacitors configured to smooth the primary DC link voltages in the power conversion cells.

6. A three-phase power conversion device comprising the three power conversion devices according to claim 1, wherein
respective phase AC powers of three-phase AC power are each input into each of the three power conversion devices; and
the three-phase AC power that has a variable frequency and is output from the three power conversion devices is used to drive a three-phase load.

* * * * *